US012283879B2

(12) United States Patent
Han

(10) Patent No.: US 12,283,879 B2
(45) Date of Patent: Apr. 22, 2025

(54) SHORT CIRCUIT REGULATING DEVICE AND MODULAR MULTI-LEVEL CONVERTER COMPRISING SAME

(71) Applicant: LS ELECTRIC CO., LTD., Anyang-si (KR)

(72) Inventor: Paul Han, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 250 days.

(21) Appl. No.: 18/035,474

(22) PCT Filed: Nov. 3, 2021

(86) PCT No.: PCT/KR2021/095090
§ 371 (c)(1),
(2) Date: May 4, 2023

(87) PCT Pub. No.: WO2022/098217
PCT Pub. Date: May 12, 2022

(65) Prior Publication Data
US 2023/0353041 A1 Nov. 2, 2023

(30) Foreign Application Priority Data
Nov. 4, 2020 (KR) .......................... 10-2020-0146296

(51) Int. Cl.
*H02M 1/34* (2007.01)
*H01R 4/64* (2006.01)
(Continued)

(52) U.S. Cl.
CPC ................ *H02M 1/34* (2013.01); *H01R 4/64* (2013.01); *H01R 4/66* (2013.01); *H02M 7/003* (2013.01)

(58) Field of Classification Search
CPC .......... H02M 1/34; H02M 7/003; H01R 4/64; H01R 4/66
See application file for complete search history.

(56) References Cited

U.S. PATENT DOCUMENTS 12,155,181 B2 * 11/2024 Tak .......................... H01G 2/02
2008/0259659 A1 10/2008 Choi et al.
(Continued)

FOREIGN PATENT DOCUMENTS

KR     20080095024 A    10/2008
KR     101456097 B1    11/2014
(Continued)

OTHER PUBLICATIONS

International Search Report for related International Application No. PCT/KR2021/095090; action dated May 12, 2022; (5 pages).
(Continued)

*Primary Examiner* — Adolf D Berhane
(74) *Attorney, Agent, or Firm* — K&L Gates LLP

(57) ABSTRACT

A short circuit regulating device and a modular multi-level converter comprising the same are disclosed. The short circuit regulating device according to each embodiment of the present disclosure includes an energization block energizably connected to the capacitor assembly and a shorting block contacting or spaced apart from the energization block. Each face of the energization block and the shorting block facing each other is in contact with each other or separated from each other.
The shorting block is coupled to the support portion. A cam member is rotatably coupled to the support portion, and an elastic member elastically supports the energization block and the shorting block. Therefore, contact and separation between the energization block and the shorting block can be performed by rotation of the cam member.

20 Claims, 30 Drawing Sheets

(51) Int. Cl.
*H01R 4/66* (2006.01)
*H02M 7/00* (2006.01)

(56) References Cited

U.S. PATENT DOCUMENTS

2018/0076727 A1 3/2018 Bakran et al.
2018/0375424 A1 12/2018 Kim et al.

FOREIGN PATENT DOCUMENTS

| KR | 20170070599 A | 6/2017 |
| KR | 101762407 B1 | 7/2017 |
| KR | 20190047437 A | 5/2019 |
| KR | 101994143 B1 | 6/2019 |

OTHER PUBLICATIONS

Written Opinion for related International Application No. PCT/KR2021/095090; action dated May 12, 2022; (6 pages).

* cited by examiner

SHORT CIRCUIT REGULATING DEVICE AND MODULAR MULTI-LEVEL CONVERTER COMPRISING SAME

CROSS-REFERENCE TO RELATED APPLICATION

This application is a National Stage of International Application No. PCT/KR2021/095090, filed on Nov. 3, 2021, which claims priority to and the benefit of Korean Patent Application No. 10-2020-0146296, filed on Nov. 4, 2020, the disclosure of which is incorporated herein by reference in its entirety.

FIELD

The present disclosure relates to a short circuit regulating device and a modular multi-level converter comprising the same, and more particularly, to a short circuit regulating device having a structure capable of simultaneously shorting or opening a plurality of sub-modules and a modular multi-level converter comprising the same.

BACKGROUND

A flexible AC transmission system (FACTS) or a new power transmission system is an operating technology that increases the flexibility of a power system by introducing a power electronic control technology to an AC power system.

Specifically, the flexible AC transmission system may control transmitted power using a power semiconductor switching element. Such a flexible AC transmission system can maximize facility utilization of transmission lines, increase transmission capacity, and minimize voltage fluctuations.

In a flexible AC transmission system, power storage and input/output are achieved by capacitor elements. The capacitor element may be controlled by a switching element. Specifically, the switching element may control input and output of current to and from the capacitor element.

At this time, the capacitor element and the switching element may be modularized and configured. Each module constituted by the capacitor element and the switching element may be referred to as a "sub-module". The voltage capacity and the like can be easily adjusted by adjusting the number of sub-modules.

A plurality of sub-modules may be provided. The rated capacity of the flexible AC transmission system can be adjusted according to the number of sub-modules. At this time, each of the plurality of sub-modules is energizably connected to an external power source or load.

When maintenance of one or more sub-modules among a plurality of sub-modules is required, the flexible AC transmission system must cut off the energization with an external power source or load. At this time, manipulating all the sub-modules one by one may result in a decrease in work efficiency.

Korean Patent Publication No. 10-2017-0070599 discloses a short circuit device for grounding a converter. Specifically, a short circuit device having a structure capable of simultaneously grounding a plurality of sub-modules by connecting a contactor energizably connected to the plurality of sub-modules is disclosed.

By the way, this type of short circuit device is a type in which a plurality of sub-modules are electrically grounded to each other by sliding the contactor. Therefore, it is difficult to ensure reliability of electrical contact between the contactor and the sub-module.

Korean Patent Registration No. 10-1994143 discloses a converter device and a method for protecting the short circuit. Specifically, a converter device having a structure in which a DC voltage switch is utilized to redirect short circuit currents flowing in DC voltage lines of bypassed sub-modules onto a freewheeling path and a short circuit protection method thereof are disclosed.

However, this type of short circuit device has a limitation in that it focuses only on measures to improve the protection of the converter device. In other words, the prior art documents do not suggest a method for simultaneously and reliably short circuiting a plurality of sub-modules.

(Patent Document 1) Korean Patent Publication No. 10-2017-0070599 (2017 Jun. 22)

(Patent Document 2) Korean Registered Patent No. 10-1994143 (2019 Jun. 28)

SUMMARY

An object of the present disclosure is to provide a short circuit regulating device having a structure capable of solving the above problems, and a modular multi-level converter comprising the same.

First, an object of the present disclosure is to provide a short circuit regulating device having a structure in which short circuit reliability of a capacitor may be improved, and a modular multi-level converter comprising the same.

In addition, one object of the present disclosure is to provide a short circuit regulating device having an easy-to-operate structure for shorting a capacitor, and a modular multi-level converter comprising the same.

In addition, one object of the present disclosure is to provide a short circuit regulating device having a simple structure of a member provided to short circuit a capacitor and a modular multi-level converter comprising the same.

In addition, one object of the present disclosure is to provide a short circuit regulating device having a structure capable of short circuiting a plurality of capacitors at the same time, and a modular multi-level converter comprising the same.

In addition, one object of the present disclosure is to provide a short circuit regulating device having a structure that can easily check whether a capacitor is shorted, and a modular multi-level converter comprising the same.

To achieve the above object, the present disclosure provides a short circuit regulating device including: a first support plate extending in one direction; a second support plate extending in one direction, spaced apart from the first support plate, positioned facing the first support plate, and moves in a direction toward the first support plate and in a direction opposite to the first support plate along the other direction; an energization block coupled to the first support plate, positioned to face the second support plate, and energizably connected to an external capacitor assembly; a shorting block coupled to the second support plate, positioned to face the energization block, and energizably connected to an external ground; and a cam member positioned between the first support plate and the second support plate, and in contact with the first support plate and the second support plate, respectively, in which the cross section of the cam member is formed with different lengths in one direction and in the other direction, and when the cam member is rotated, the shorting block is in contact with or spaced apart from the energization block.

In addition, the cam member of the short circuit regulating device may have an elliptical cross section.

In addition, the cam member of a short circuit regulating device may include a first surface that forms a portion of the outer circumferential surface, has a minor axis as a string, and has a predetermined curvature; and a second surface that is continuous with the first surface, forms the remaining portion of the outer circumferential surface, has a major axis as a string, and has a predetermined curvature smaller than the first surface, and when the cam member is rotated, the first surface and the second surface may be alternately in contact with the first support plate and the second support plate, respectively.

In addition, the short circuit regulating device may further include a shaft member positioned between the first support plate and the second support plate and coupled to the cam member to rotate together with the cam member; and a handle member coupled to the shaft member to rotate together with the shaft member and extending outwardly.

In addition, the handle member of the short circuit regulating device may be provided to be rotatable by a predetermined angle in a clockwise direction or a counterclockwise direction, and the cam member may be rotated by the predetermined angle together with the handle member.

In addition, the predetermined angle of the short circuit regulating device may be a right angle, In addition, the short circuit regulating device may further include an elastic member coupled to the first support plate and the second support plate, respectively to apply a restoring force in a direction toward the first support plate to the second support plate.

In addition, the magnitude of the restoring force stored in the elastic member when the energization block and the shorting block of the short circuit regulating device are spaced apart may be greater than the magnitude of the restoring force stored in the elastic member when the energization block and the shorting block are in contact with each other.

In addition, the elastic member of the short circuit regulating device may be provided as a coil spring and may extend between the first support plate and the second support plate, and may be positioned to overlap the energization block and the shorting block along the other direction.

In addition, the elastic member of the short circuit regulating device may be provided as a coil spring extending in the other direction, and each end of the extension direction may be coupled to each surface of the first support plate and the second support plate facing each other, and each end of the elastic member may be positioned adjacent to the energization block and the shorting block, respectively.

In addition, the energization block and the shorting block the short circuit regulating device may be each formed to have a predetermined thickness, and the extension length of the elastic member in a state in which the energization block and the shorting block are in contact with each other may be equal to or less than the sum of the thickness of the energization block and the thickness of the shorting block.

In addition, the elastic member of the short circuit regulating device may be provided with a band of stretchable material, may surround the first support plate and the second support plate from the outside, may be coupled to the first support plate and the second support plate, and may be positioned overlapping with the energization block and the shorting block along the other direction.

In addition, the elastic member of the short circuit regulating device may be provided as a torsion spring, and each end in the extending direction may be coupled to each surface where the first support plate and the second support plate face each other, and each end of the elastic member may be positioned adjacent to the energization block and the shorting block, respectively.

In addition, a plurality of energization blocks and a plurality of shorting blocks the short circuit regulating device may be provided, respectively, a plurality of the energization blocks may be spaced apart from each other in the one direction and is energizably connected to each of the plurality of capacitor assemblies, and a plurality of shorting blocks may be spaced apart from each other in the one direction and positioned to overlap each other with a plurality of the energization blocks in the other direction, respectively.

In addition, the present disclosure provides a modular multi-level converter, including a frame; a plurality of capacitor assemblies inserted into or withdrawn from the frame; and a short circuit regulating device coupled to the frame and energizably connected to the capacitor assembly and an external ground, respectively, in which the short circuit adjustment device includes a first support plate coupled to the frame and extending in one direction; a second support plate extending in one direction, spaced apart from the first support plate, positioned facing the first support plate, and coupled to the first support plate to be movable in a direction toward the first support plate and in a direction opposite to the first support plate; a plurality of energization blocks coupled to the first support plate, positioned to face the second support plate, and energizedly connected to the plurality of capacitor assemblies, respectively; a plurality of shorting blocks coupled to the second support plate, positioned to face the plurality of energization blocks, and energizedly connected to an external ground to be energized, respectively; a cam member rotatably positioned between the first support plate and the second support plate and in contact with the first support plate and the second support plate, respectively; and an elastic member coupled to the first support plate and the second support plate, respectively, to apply a restoring force in a direction toward the first support plate to the second support plate, the cam member has the cross section having an ellipse shape including a major axis and a minor axis, respectively, when the cam member is rotated and the minor axis is arranged in the one direction, the shorting block and the energization block are spaced apart, and when the cam member is rotated and the major axis is arranged in the one direction, the shorting block and the energization block are in contact with each other.

In addition, a plurality of the shorting blocks and a plurality of the energization blocks of the modular multi-level converter may be disposed spaced apart from each other in the one direction, and the plurality of elastic members may be provided, may be spaced apart from each other in the one direction and may be positioned adjacent to the shorting block and the energization block, respectively.

In addition, the elastic member of the modular multi-level converter may be provided as a coil spring and extends between the first support plate and the second support plate, and may be positioned to overlap the energization block and the shorting block in the other direction.

In addition, the elastic member of the modular multi-level converter may be provided as a coil spring and extends between the first support plate and the second support plate, and one end in the extending direction may be coupled with the first supporting plate between a plurality of the energization blocks, and the other end in the extending direction may be coupled with the second supporting plate between a plurality of the shorting blocks.

In addition, the elastic member of the modular multi-level converter may be provided with a band of stretchable material, may surround the first support plate and the second support plate from the outside and may be coupled to the first support plate and the second support plate, and may be positioned to overlap with the energization block and the shorting block in the other direction, In addition, the modular multi-level converter may further include a shaft member positioned between the first support plate and the second support plate and coupled to the cam member to rotate together; and a handle member coupled to the shaft member to rotate together with the shaft member and extending outwardly.

In this embodiment, contact and separation between the energization block and the shorting block can be performed by the rotation of the cam member, so that short circuit reliability of the capacitor may be improved.

DETAILED DESCRIPTION

Hereinafter, with reference to the accompanying drawings, a short circuit regulating device 400, 500, 600, and 700 according to an embodiment of the present disclosure and a modular multi-level converter 1 comprising the same will be described in detail.

In the following description, descriptions of some components may be omitted to clarify the characteristics of the present disclosure.

1. Definition of Terms

The term "energization" used in the following description means a state in which an electrical signal such as current is transmitted between one or more members. In one embodiment, the energized state may be formed by a conducting wire or the like.

The terms "front side", "rear side", "left side", "right side", "upper side" and "lower side" used in the following description will be understood with reference to the coordinate system illustrated in FIGS. 1, 3, 9, 11 and 13.

Figure 1:
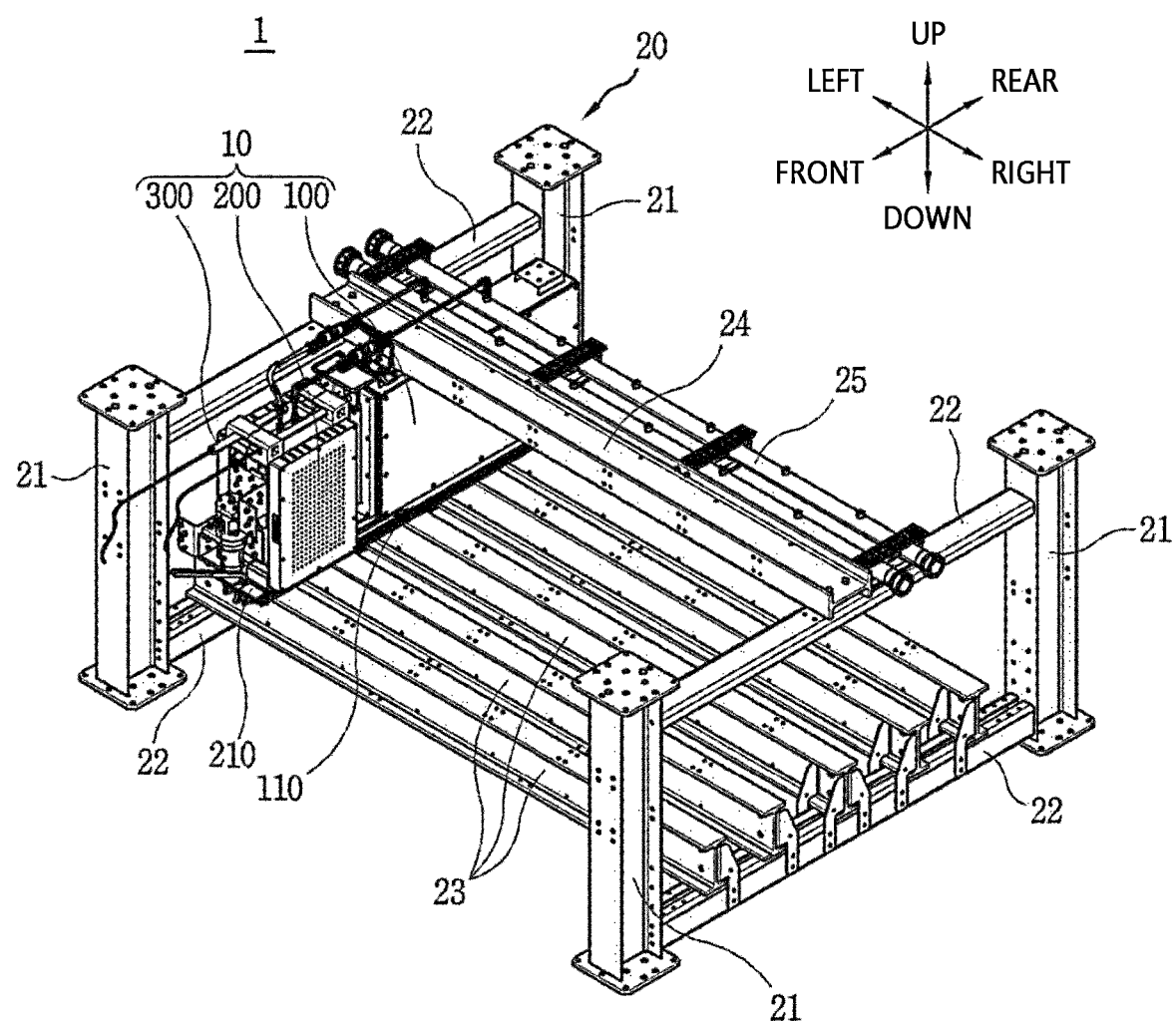
FIG. 1 is a perspective view illustrating a power compensation device including a ground mechanism according to an embodiment of the present disclosure.
Figure 2:
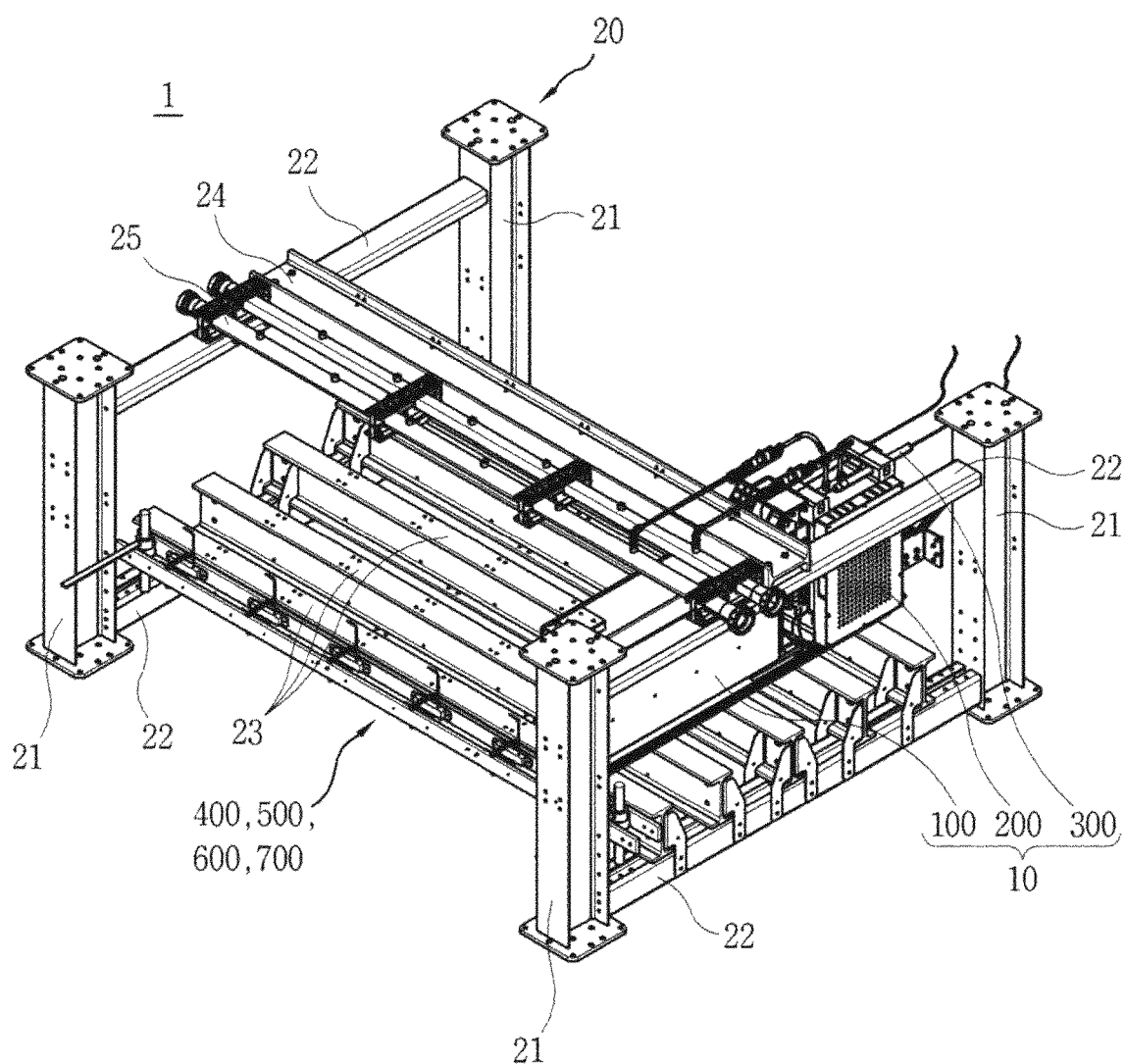
FIG. 2 is a perspective view illustrating the power compensation device of FIG. 1 from another angle.

2. Description of Configuration of Modular Multi-Level Converter 1 According to Embodiment of Present Disclosure Referring to FIGS. 1 and 2, a modular multi-level converter 1 according to an embodiment of the present disclosure is illustrated. The modular multi-level converter 1 may function as a static synchronous compensator (STATCOM).

In other words, the modular multi-level converter 1 is a kind of stationary reactive power compensator and performs a function of increasing stability by supplementing a loss voltage during transmission and distribution of electricity or power.

Hereinafter, the configuration of the modular multi-level converter 1 according to an embodiment of the present disclosure will be described with reference to the accompanying drawings. In the illustrated embodiment, the modular multi-level converter 1 includes a sub-module 10 and a frame 20.

(1) Description of the Configuration of the Sub-Module 10

The sub-module 10 is energizably connected to an external power source or load to substantially perform the function of the modular multi-level converter 1.

The sub-module 10 is coupled to the frame 20. Specifically, the sub module 10 is coupled to the frame 20 so as to be slidably movable. In the illustrated embodiment, the sub-module 10 is coupled to or separated from the frame 20 by sliding in the forward and backward directions.

The sub-module 10 may be supported by the frame 20. Specifically, the lower side of the sub module 10 coupled to the frame 20 may be supported by the support frame 23.

Although not illustrated, a plurality of sub-modules 10 may be provided. The plurality of sub-modules 10 may be spaced apart from each other and coupled to the frame 20, respectively. In the illustrated embodiment, the plurality of sub-modules 10 may be spaced apart from each other in the left and right direction.

At this time, the plurality of sub-modules 10 are connected to the energization blocks 420, 520, 620, 720 by the conducting wire members 421, 521, 621, and 721 of the short circuit regulating devices 400, 500, 600, and 700 to be described later, and it is preferable that they are positioned so that they can be energizably connected to each other.

In addition, each of the plurality of sub-modules 10 is energizably connected to short circuit regulating devices 400, 500, 600, and 700 to be described later. Accordingly, when a single short circuit regulating device 400, 500, 600, or 700 is manipulated, a plurality of sub-modules 10 may be simultaneously short circuited or simultaneously opened. A detailed description thereof will be described later.

In the illustrated embodiment, the sub-module 10 includes a capacitor assembly 100, a valve assembly 200 and a grounding portion 300.

The capacitor assembly 100 is physically and energizably connected to the valve assembly 200. The sub module 10 may be formed by physically and electrically connecting the capacitor assembly 100 and the valve assembly 200.

The capacitor assembly 100 includes a capacitor element (not illustrated) therein. The capacitor assembly 100 is energizably connected to the valve assembly 200. A capacitor element (not illustrated) inside the capacitor assembly 100 may be charged or discharged by a switching operation of the valve assembly 200.

Accordingly, the capacitor device (not illustrated) may store power energy input to the sub-module 10. Power energy stored in a capacitor device (not illustrated) may be used as a power source for driving each component of the sub-module 10. In addition, the power energy may be supplied as reactive power to an external power system to which the sub-module 10 is energizably connected.

In the illustrated embodiment, the capacitor assembly 100 is connected to the rear side of the valve assembly 200. This is due to the frequent occurrence of situations in which the valve assembly 200 needs to be maintained rather than the capacitor assembly 100.

The capacitor assembly 100 provided in each sub-module 10 is energizably connected to each energization block 420, 520, 620, and 720 of the short circuit regulating devices 400, 500, 600, and 700. The connection is achieved by conducting wire members 421, 521, 621, and 721 provided in each of the short circuit regulating devices 400, 500, 600, and 700.

Therefore, when the short circuit regulating devices 400, 500, 600, and 700 are operated so that each energization block 420, 520, 620, and 720 and each shorting block 430, 530, 630, and 730 come into contact or are separated from each other, each capacitor assembly 100 can be shorted or open at the same time. A detailed description thereof will be described later.

In the illustrated embodiment, the capacitor cart portion 110 is positioned below the capacitor assembly 100.

Capacitor assembly 100 is seated on capacitor cart portion 110. In one embodiment, the capacitor assembly 100 may be fixedly coupled to the capacitor cart portion 110.

The capacitor cart portion 110 supports the capacitor assembly 100 from a lower side. In other words, the capacitor assembly 100 is seated on the capacitor cart portion 110.

As described above, in the modular multi-level converter 1 according to the exemplary embodiment of the present disclosure, a plurality of sub-modules 10 are energizably connected to each other so that the rated capacity thereof can be increased.

Thus, the number of capacitor cart portions 110 may be provided as many as the number of capacitor assemblies 100 to support the capacitor assemblies 100 provided in each sub-module 10 from the lower side.

The capacitor cart portion 110 may be slidably coupled to the frame 20. Specifically, the capacitor cart portion 110 is slidably coupled to a frame rail (not illustrated) extending across the plurality of support frames 23.

The capacitor cart portion 110 may be slid in a direction toward and opposite to the short circuit regulating devices 400, 500, 600, and 700, that is, the rear side and the front side in the illustrated embodiment in a state of being coupled to the frame rail (not illustrated).

The valve assembly 200 is a portion where the sub-module is energizably connected to an external power source or load. In addition, the valve assembly 200 is energizably connected to the capacitor assembly 100, so that power energy can be input or output.

The valve assembly 200 may include a plurality of switching modules therein. In one embodiment, the switching module may include an Insulated Gate Bipolar Transistor (IGBT).

In addition, the valve assembly 200 may include a control board for controlling the switching module therein. In one embodiment, the control board may be provided as a printed circuit board (PCB).

In the illustrated embodiment, the valve assembly 200 is positioned on the front side of the capacitor assembly 100. This is because maintenance of the valve assembly 200 is performed more frequently than maintenance of the capacitor assembly 100.

In the illustrated embodiment, a valve assembly cart portion 210 is positioned below the valve assembly 200.

The valve assembly 200 is seated on a valve assembly cart portion 210. In one embodiment, the valve assembly 200 may be fixedly coupled to the valve assembly cart portion 210.

The valve assembly cart portion 210 supports the valve assembly 200 from the lower side. In other words, the valve assembly 200 is seated on the valve assembly cart portion 210.

As described above, in the modular multi-level converter 1 according to the embodiment of the present disclosure, a plurality of sub-modules 10 are energizably connected to each other so that the rated capacity thereof can be increased.

Thus, the number of the valve assembly cart portion 210 may be provided as many as the number of valve assemblies 200 to support the valve assemblies 200 provided in each sub module 10 from the lower side.

The valve assembly cart portion 210 may be slidably coupled to the frame 20. Specifically, the valve assembly cart portion 210 is slidably coupled to a frame rail (not illustrated) extending across the plurality of support frames 23.

The valve assembly cart portion 210 may be slid in a direction toward and opposite to the short circuit regulating devices 400, 500, 600, and 700, that is, the rear side and the front side in the illustrated embodiment in a state of being coupled to the frame rail (not illustrated).

At this time, the valve assembly cart portion 210 may be moved together with the capacitor cart portion 110 or separately. Accordingly, any one or more of the capacitor assembly 100 or the valve assembly 200 seated on each of the cart portions 110 and 210 may be coupled to or separated from the frame 20.

Accordingly, the heavy capacitor assembly 100 or the valve assembly 200 can be easily installed or removed.

The ground portion 300 is detachably coupled to the capacitor assembly 100 or the valve assembly 200. When the ground portion 300 is coupled, power stored in the capacitor assembly 100 may be discharged. The above process may be performed after the grounding part 300 penetrates the valve assembly 200 and is coupled with the capacitor assembly 100.

The ground portion 300 may be utilized to discharge power stored inside the single number of capacitor assemblies 100. To this end, the ground portion 300 may be energizably connected to the external ground.

Therefore, when the specific capacitor assembly 100 needs to be separated from the frame 20, the capacitor assembly 100 may be discharged simply by coupling the grounding portion 300 to the specific capacitor assembly 100.

(2) Description of Frame 20

The frame 20 forms the framework of the modular multi-level converter 1. The frame 20 supports the capacitor assembly 100 and the valve assembly 200 from the top or bottom. In the illustrated embodiment, frame 20 supports capacitor assembly 100 and valve assembly 200 from the lower side.

A capacitor assembly 100 and a valve assembly 200 are detachably installed in the frame 20. As noted above, the installation may be accomplished by the capacitor cart portion 110 and the valve assembly cart portion 210.

The frame 20 may be formed of a material of high rigidity. In one embodiment, the frame 20 may be formed of a steel material. In another embodiment, the frame 20 may be formed of glass fiber reinforced plastic (FRP) as a material.

In addition, the shape of the frame 20 is provided in the form of an H-Beam, so that the rigidity of the frame 20 in the axial direction can be further reinforced.

A plurality of frames 20 may be provided. A plurality of frames 20 may be stacked on each other. In addition, the capacitor assembly 100 and the valve assembly 200 supported by the frame 20 may also be arranged in a plurality of layers. Accordingly, the capacity of the modular multi-level converter 1 can be increased.

Each of the frames 21, 22, 23, and 24 of the frame 20 to be described later may be formed in a shape capable of ensuring sufficient rigidity in the extension direction and in directions different from the extension direction. For example, each of the frames 21, 22, 23, and 24 may be provided as an H-Beam having an "H" cross section.

In the illustrated embodiment, the frame 20 includes an upper frame 21, a horizontal frame 22, a support frame 23, a fixed frame 24, and a pipe member 25.

The upper frame 21 forms the outer side of the frame 20 together with the horizontal frame 22. The upper frame 21 extends in the height direction, that is, in the up and down direction of the frame 20 in the illustrated embodiment.

A plurality of upper frames 21 may be provided. A plurality of upper frames 21 may be spaced apart from each other and disposed at different locations. In the illustrated embodiment, four upper frames 21 are provided, and are positioned on the left and right sides of the front and the left and right sides of the rear, respectively.

The upper frame 21 is connected to the horizontal frame 22. The horizontal frame 22 may extend between a plurality of upper frames 21 positioned adjacent to each other. A plurality of horizontal frames 22 may be provided and connected to the upper frame 21 at different locations.

In the illustrated embodiment, the horizontal frame 22 extends between a pair of upper frames 21 respectively positioned in the left and right direction. Further, horizontal frames 22 extend from the upper and lower sides of each pair of upper frames 21, respectively.

A support frame 23 is seated on the horizontal frame 22.

The support frame 23 supports a frame rail (not illustrated) to which the capacitor cart portion 110 and the valve assembly cart portion 210 are slidably coupled.

The support frame 23 is coupled with the horizontal frame 22. Specifically, the support frame 23 is combined with different horizontal frames 22 that are combined with a pair of upper frames 21 different from each other, respectively.

In the illustrated embodiment, the support frame 23 extends in the left and right direction, and the left end is coupled with the horizontal frame 22 positioned on the lower side of the left side. In addition, the right end of the support frame 23 is coupled with the horizontal frame 22 positioned on the lower side of the right side.

A plurality of support frames 23 may be provided. A plurality of support frames 23 may be spaced apart from each other in a direction in which frame rails (not illustrated) extend. In the illustrated embodiment, five support frames 23 are provided and disposed spaced apart from each other in the front and rear direction.

Accordingly, the plurality of support frames 23 may support frame rails (not illustrated) at a plurality of locations. Accordingly, the frame rail (not illustrated) and the capacitor cart portion 110 and the valve assembly cart portion 210 coupled thereto may be stably supported.

The short circuit regulating device 400, 500, 600, and 700 is positioned at the support frame 23 of the plurality of support frames 23 at the end of the arrangement direction, that is, the support frame 23 positioned at the rearmost side in the illustrated embodiment. It will be understood that this is due to the fact that the capacitor assembly 100 is relatively positioned at the rear side of the sub-modules 10 coupled to the frame 20.

A detailed description of the configuration and operation of the short circuit regulating devices 400, 500, 600, and 700 will be described later.

The fixing frame 24 supports the pipe member 25 through which fluid for cooling components inside the valve assembly 200 flows. In addition, the fixed frame 24 supports a plurality of horizontal frames 22 spaced apart from each other.

The fixed frame 24 extends between a plurality of horizontal frames 22 spaced apart from each other. In the illustrated embodiment, the fixed frame 24 extends in the left and right direction and is respectively connected to the horizontal frames 22 positioned on each upper side in the left and right direction.

Accordingly, each of the horizontal frames 22 positioned on the left and right upper sides is supported by the fixed frame 24, so that the structure can be stably maintained.

A piping member 25 is positioned adjacent to the fixing frame 24. The pipe member 25 may be supported on one side, that is, the rear side in the illustrated embodiment, by the fixing frame 24.

The pipe member 25 functions as a passage through which a fluid for cooling components provided in the valve assembly 200 flows.

The piping member 25 is fluidly connected to an external fluid supply source (not illustrated). Fluid for cooling the valve assembly 200 may be supplied from the fluid supply source (not illustrated).

The piping member 25 is fluidly connected to valve assembly 200. The fluid passing through the pipe member 25 may circulate inside the valve assembly 200 and then flow back to the fluid supply source (not illustrated).

The pipe member 25 may include a plurality of pipes. It will be understood that the fluid prior to heat exchange flows in one or more of the plurality of pipes, and the fluid heat-exchanged with the components of the valve assembly 200 flows in the other one or more of the plurality of pipes.

The piping member 25 may be provided with a member such as a pump to provide a transfer force for flowing fluid flowing inside the piping member 25.

3. Description of Short Circuit Regulating Device 400, 500, 600, 700 According to an Embodiment of the Present Disclosure Referring back to FIG. 2, the modular multi-level converter 1 according to an embodiment of the present disclosure includes short circuit regulating devices 400, 500, 600, and 700.

The short circuit regulating devices 400, 500, 600, and 700 are energizably connected to a plurality of sub-modules 10 provided in the modular multi-level converter 1, respectively. Specifically, the short circuit regulating devices 400, 500, 600, and 700 are energizably connected to the plurality of capacitor assemblies 100 provided in the plurality of sub-modules 10, respectively.

When the short circuit regulating devices 400, 500, 600, and 700 are operated, the plurality of capacitor assemblies 100 are electrically connected to each other. The plurality of capacitor assemblies 100 electrically connected to the short circuit regulating devices 400, 500, 600, and 700 may be short circuited or open at the same time.

It will be understood that when a plurality of capacitor assemblies 100 are short circuited to each other at the same time, each capacitor assembly 100 is regulated to the same voltage.

At this time, the short circuit regulating devices 400, 500, 600, and 700 are always electrically connected to the ground. Accordingly, as the short circuit regulating devices 400, 500, 600, and 700 operate, the plurality of capacitor assemblies 100 may be simultaneously grounded.

In particular, the short circuit regulating devices 400, 500, 600, and 700 according to each embodiment of the present disclosure do not slide and move in the longitudinal direction, but move in a direction toward the capacitor assembly 100 or in a direction opposite thereto.

Accordingly, contact reliability of the energization block 420, 520, 620, and 720 and the shorting block 430, 530, 630, and 730 provided in the short circuit regulating device 400, 500, 600, 700 may be improved.

As a result, short circuiting and opening of the plurality of capacitor assemblies 100 energizably connected to the short circuit regulating devices 400, 500, 600, and 700 can be easily and reliably performed.

The short circuit regulating devices 400, 500, 600, and 700 are coupled to the frame 20. Specifically, the short circuit regulating devices 400, 500, 600, and 700 are coupled to any one support frame 23 of the plurality of support frames 23 provided in the frame 20 positioned adjacent to the capacitor assembly 100, that is the support frame 23 positioned at the rearmost side in the illustrated embodiment.

The short circuit regulating devices 400, 500, 600, and 700 are energizably connected to the plurality of capacitor assemblies 100, respectively. Accordingly, when the short circuit regulating devices 400, 500, 600, and 700 are operated, the plurality of capacitor assemblies 100 may be energizably connected.

The short circuit regulating devices 400, 500, 600, and 700 are energizably connected to the ground. Accordingly, a portion of the short circuit regulating devices 400, 500, 600, and 700, that is, the shorting block 430, 530, 630, and 730 can always be kept grounded.

Hereinafter, with reference to FIGS. 3 to 14, short circuit regulating devices 400, 500, 600, and 700 according to each embodiment of the present disclosure will be described in detail.

(1) Description of Short Circuit Regulating Device 400 According to an Embodiment of Present Disclosure Referring to FIGS. 3 to 8, a short circuit regulating device 400 according to an embodiment of the present disclosure is illustrated.

In the illustrated embodiment, the short circuit regulating device 400 includes a support portion 410, an energization block 420, a shorting block 430, an elastic member 440, a shaft member 450, a cam member 460, and a handle member 470.

The support portion 410 forms the body of the short circuit regulating device 400. The support portion 410 is a portion where the short circuit adjusting device 400 is combined with the frame 20 (that is, the support frame 23).

The support portion 410 is movably coupled to the support frame 23. Specifically, the support portion 410 has one side (that is, the rear side) coupled to the support frame 23, and the other side (that is, the front side) spaced apart from the one side, the other side can be moved in the direction facing the one side or the direction opposite thereto.

The support portion 410 extends in the direction in which the support frame 23 extends, that is, in the left and right direction in the illustrated embodiment. The support portion 410 may extend shorter than the extension length of the support frame 23.

On one side of the support portion 410 facing the support frame 23, that is, on the rear side in the illustrated embodiment, the energization block 420 is positioned. On the other side of the support portion 410 opposite to the support frame 23, that is, the front side in the illustrated embodiment, the shorting block 430 is positioned.

An elastic member 440 is coupled to the support portion 410. The elastic member 440 applies an elastic force to the plurality of support plates 441 and 442 provided in the support portion 410. As will be described later, the elastic force is formed in a direction in which the plurality of support plates 441 and 442 face each other.

A shaft member 450 and a cam member 460 are coupled to the support portion 410. As the shaft member 450 and the cam member 460 rotate, the distance between the plurality of support plates 411 and 412 constituting the support portion 410 may be adjusted.

Accordingly, the energization block 420 and the shorting block 430 respectively provided on the plurality of support plates 411 and 412 may be in contact with or spaced apart from each other.

In the illustrated embodiment, the support portion 410 includes a first support plate 411, a second support plate 412 and a space portion 413.

The first support plate 411 may be defined as one of a plurality of support plates 411 and 412 provided in the support portion 410. The first support plate 411 is positioned in the direction toward the support frame 23, that is, the rear side in the illustrated embodiment, and coupled to the support frame 23. In one embodiment, the first support plate 411 may be fixedly coupled to the support frame 23.

The first support plate 411 extends in the direction in which the support frame 23 extends, that is, in the left and right direction in the illustrated embodiment. The extension length of the first support plate 411 may be equal to or less than the extension length of the support frame 23. In addition, the extension length of the first support plate 411 may be the same as the extension length of the second support plate 412.

The first support plate 411 may be provided in a plate shape including a plurality of surfaces facing each other. In the illustrated embodiment, the first support plate 411 has a thickness in the front and rear direction, and a front surface and a rear surface are formed to face each other.

A plurality of energization blocks 420 may be disposed side by side and spaced apart from each other in the extension direction of the first support plate 411 on the front surface of the first support plate 411. The rear surface of the first support plate 411 may be in contact with and coupled to the support frame 23.

In addition, the front surface of the first support plate 411 faces the rear surface of the second support plate 412 with the space portion 413 interposed therebetween.

Furthermore, any one of the first surface 461 and the second surface 462 of the cam member 460 may come into contact with the front surface of the first support plate 411. The surface contacting the first support plate 411 may be changed according to the rotation of the cam member 460, and a detailed description thereof will be described later.

The first support plate 411 faces the second support plate 412 with the space portion 413 interposed therebetween.

The second support plate 412 may be defined as another one of the plurality of support plates 411 and 412 provided in the support portion 410. The second support plate 412 is positioned in the opposite direction to the support frame 23, that is, on the front side in the illustrated embodiment.

The second support plate 412 is movably provided. Specifically, the second support plate 412 may be moved to any one direction of a direction facing the first support plate 411 (that is, the rear side) and a direction opposite to the first support plate 411 (that is, the front side).

When the second supporting plate 412 is moved toward the first supporting plate 411, the energization block 420 and the shorting block 430 may come into contact with each other. In addition, when the second support plate 412 is moved opposite to the first support plate 411, the energization block 420 and the shorting block 430 may be spaced apart from each other.

The second support plate 412 is spaced apart from the first support plate 411. In this case, the distance between the second support plate 412 and the first support plate 411 may be changed by the movement of the second support plate 412.

The movement is achieved by shape deformation of the elastic member 440 and rotation of the shaft member 450 and the cam member 460, which will be described in detail later.

The second support plate 412 extends in the direction in which the support frame 23 extends, that is, in the left and right direction in the illustrated embodiment. It will be understood that the direction is the same as the extension direction of the first support plate 411.

The extension length of the second support plate 412 may be equal to or less than the extension length of the support frame 23.

In addition, the extension length of the second support plate 412 may be the same as the extension length of the first support plate 411.

The second support plate 412 is disposed to overlap the first support plate 411 in its thickness direction, that is, in the front and rear direction in the illustrated embodiment.

In other words, each end of the second support plate 412 in its extension direction overlaps each end of the first support plate 411 in its extension direction in the front and rear direction.

The second support plate 412 may be provided in a plate shape including a plurality of surfaces facing each other. In the illustrated embodiment, the second support plate 412 has a thickness in the front and rear direction, and a front surface and a rear surface are formed to face each other.

The rear surface of the second support plate 412 may face the front surface of the first support plate 411 with the space portion 413 interposed therebetween. A plurality of shorting blocks 430 may be spaced apart from each other and arranged side by side on the rear surface of the second support plate 412 in the extending direction of the second support plate 412.

In addition, the other one of the first surface 461 and the second surface 462 of the cam member 460 may come into contact with the rear surface of the second support plate 412. The surface contacting the second support plate 412 may be changed according to the rotation of the cam member 460, and a detailed description thereof will be described later.

Elastic members 440 are coupled to the first support plate 411 and the second support plate 412, respectively. In the illustrated embodiment, each end of the elastic member 440 is coupled to the upper corner of the first support plate 411 and the upper corner of the second support plate 412.

The elastic member 440 applies a restoring force in the direction of decreasing the distance between the first support plate 411 and the second support plate 412. In other words, the elastic member 440 applies an elastic force in a direction toward the first support plate 411 to the second support plate 412.

The distance between the first support plate 411 and the second support plate 412 may be adjusted between the first distance D1 and the second distance D2.

In other words, the maximum distance between the first support plate 411 and the second support plate 412 may be defined as the first distance D1. In addition, the minimum distance between the first support plate 411 and the second support plate 412 may be defined as the second distance D2.

When the first support plate 411 and the second support plate 412 are spaced apart by the first distance D1, the energization block 420 and the shorting block 430 are spaced apart from each other. In addition, when the first support plate 411 and the second support plate 412 are spaced apart by the second distance D2, the energization block 420 and the shorting block 430 come into contact with each other.

The first distance D1 and the second distance D2 may be determined according to the shapes of the energization block 420, the shorting block 430, and the cam member 460. A detailed description thereof will be described later.

A space portion 413 is formed between the second support plate 412 and the first support plate 411.

The space portion 413 is a space in which the first support plate 411 and the second support plate 412 are spaced apart in the thickness direction, that is, in the front and rear direction in the illustrated embodiment. In other words, the space portion 413 is a space formed between the first support plate 411 and the second support plate 412. The first support plate 411 and the second support plate 412 are disposed to face each other with the space portion 413 interposed therebetween.

The space portion 413 extends in the direction in which the first support plate 411 and the second support plate 412 extend, that is, in the left and right direction in the illustrated embodiment. In addition, the space portion 413 is formed to have a width in the thickness direction of the first support plate 411 and the second support plate 412, that is, in the front and rear direction in the illustrated embodiment.

The length of the width of the space portion 413 may be changed. In other words, when the second support plate 412 is moved toward the first support plate 411, the length of the width of the space portion 413 is reduced. In addition, when the second support plate 412 is moved opposite to the first support plate 411, the length of the width of the space portion 413 is increased.

A plurality of energization blocks 420 and a plurality of shorting blocks 430 are positioned in the space portion 413. As the length of the width of the space portion 413 is changed, the plurality of energization blocks 420 and the plurality of shorting blocks 430 may be in contact with each other or spaced apart from each other.

The shaft member 450 and the cam member 460 are positioned in the space portion 413. The shaft member 450 and the cam member 460 may be rotated while being accommodated in the space portion 413. In the illustrated embodiment, the shaft member 450 and the cam member 460 are positioned adjacent to each end in the direction in which the space portion 413 extends, that is, each end in the left and right direction in the illustrated embodiment.

The energization block 420 is energizably connected to the capacitor assembly 100 provided in the sub module 10. As described above, a plurality of sub-modules 10 may be provided. Accordingly, a plurality of energization blocks 420 may also be provided and may be energizably connected to each of the plurality of sub-modules 10.

Therefore, when the plurality of energization blocks 420 are in contact with the plurality of shorting blocks 430 at the same time, the plurality of capacitor assemblies 100 may be simultaneously short circuited and grounded. The energization block 420 may be formed of a conductive material.

The energization block 420 is coupled to the support portion 410. Specifically, the energization block 420 is coupled to one surface of the second support plate 412 or the first support plate 411 facing the space portion 413, that is, the front surface in the illustrated embodiment. In other words, the energization block 420 is accommodated in the space portion 413.

The energization block 420 may have a shape that can maximize the area of one surface facing the shorting block 430, that is, the front surface in the illustrated embodiment. Accordingly, contact reliability between the energization block 420 and the shorting block 430 may be improved. In the illustrated embodiment, the energization block 420 has a flat front surface and has a rectangular pillar shape extending in the extending direction of the first support plate 411, that is, in the left and right direction in the illustrated embodiment.

A plurality of energization blocks 420 may be provided. The plurality of energization blocks 420 may be spaced apart from each other in a direction in which the first support plate 411 extends. In the illustrated embodiment, six energization blocks 420 are provided and arranged parallel to each other and spaced apart from each other in the left and right direction.

The number and arrangement of the energization blocks 420 may be changed according to the number and arrangement of the sub-modules 10. In other words, it will be understood that the illustrated embodiment is a case in which six sub-modules 10 are provided and arranged spaced apart from each other in the left and right direction.

The energization block 420 may be in contact with and separated from the shorting block 430. When the energization block 420 contacts the shorting block 430, the plurality of capacitor assemblies 100 may be simultaneously shorted and grounded.

In the illustrated embodiment, the energization block 420 includes a conducting wire member 421.

The conducting wire member 421 energizably connects the energization block 420 and the capacitor assembly 100. The capacitor assembly 100 and the energization block 420 may be maintained at the same voltage by the conductive wire member 421.

A plurality of conducting wire members 421 may be provided. The plurality of conducting wire members 421 may energizably connect the plurality of energization blocks 420 and the plurality of capacitor assemblies 100, respectively.

In the illustrated embodiment, six conducting wire members 421 are provided and energizably connected to the six energization blocks 420, respectively.

The shorting block 430 is energizably connected to an external ground. In other words, the shorting block 430 remains grounded. The connection may be achieved by a conducting wire member (not illustrated) or the like.

The shorting block 430 is coupled to the support portion 410. Specifically, the energization block 430 is coupled to one surface of the first support plate 411 or the second support plate 412 facing the space portion 413, that is, the rear side in the illustrated embodiment. In other words, the energization block 430 is accommodated in the space portion 413.

The shorting block 430 may have a shape that maximizes the area of one surface facing the energization block 420, that is, the rear surface in the illustrated embodiment. Accordingly, contact reliability between the shorting block 430 and the energization block 420 may be improved. In the illustrated embodiment, the energization block 430 has a flat rear surface and a rectangular pillar shape extending in the extending direction of the second support plate 412, that is, in the left and right direction in the illustrated embodiment.

In one embodiment, the shape of the surface of the shorting block 430 may be the same as the shape of one surface of the energization block 420 facing the shorting block 430.

Accordingly, surfaces of the shorting block 430 and the energization block 420 may be in surface contact with each other. Accordingly, contact reliability between the shorting block 430 and the energization block 420 may be improved.

A plurality of energization blocks 430 may be provided. The plurality of energization blocks 430 may be spaced apart from each other in a direction in which the second support plate 412 extends. In the illustrated embodiment, six energization blocks 430 are provided and are spaced apart from each other in the left and right direction and arranged side by side.

The shorting block 430 may be disposed to overlap the energization block 420 in the thickness direction thereof, that is, in the front and rear direction in the illustrated embodiment. Accordingly, when the second supporting plate 412 and the shorting block 430 coupled thereto move toward the first supporting plate 411, the shorting block 430 and the energization block 420 may come into contact with each other.

The number and arrangement of shorting blocks 430 may be changed according to the number and arrangement of energization blocks 420.

The shorting block 430 may contact and be spaced apart from the energization block 420. When the shorting block 430 and the energization block 420 come into contact with each other, the plurality of capacitor assemblies 100 may be simultaneously shorted and grounded.

The energization block 420 and the shorting block 430 may be formed to have a predetermined thickness in their thickness direction, that is, in the front and rear direction in the illustrated embodiment.

Specifically, the sum of the thickness of the energization block 420 and the thickness of the shorting block 430 may be less than the first distance D1 and greater than or equal to the second distance D2.

Therefore, when the cam member 460 is rotated and the distance between the first support plate 411 and the second support plate 412 is adjusted to the first distance D1, the energization block 420 and the shorting block 430 are spaced apart from each other.

In addition, when the cam member 460 is rotated and the distance between the first support plate 411 and the second support plate 412 is adjusted to the second distance D2, the energization block 420 and the shorting block 430 are in contact with each other.

A detailed description of the process will be described later.

The elastic member 440 provides force for moving the second supporting plate 412 and the shorting block 430 coupled thereto toward the first supporting plate 411 and the energization block 420 coupled thereto.

The elastic member 440 stores restoring force by shape deformation and transfers the stored restoring force to the support portion 410.

As described above, since the first support plate 411 is fixedly coupled to the support frame 23, it will be understood that the second support plate 412 is moved by the restoring force provided by the elastic member 440.

In other words, the elastic member 440 applies a restoring force in a direction in which the energization block 420 and the shorting block 430 move toward each other to the support portion 410. Accordingly, the elastic member 440 may elastically support the first support plate 411 and the second support plate 412.

The elastic member 440 is coupled to the support portion 410. Specifically, the elastic member 440 has one side coupled to the first support plate 411 and the other side coupled to the second support plate 412. Therefore, the restoring force stored and provided by the elastic member 440 may be determined by the distance between the first support plate 411 and the second support plate 412 or the width of the space portion 413 formed therebetween.

The elastic member 440 may be provided in any form capable of storing restoring force by shape deformation and transmitting the stored restoring force to other members. In the illustrated embodiment, the elastic member 440 is provided as a coil spring extending in the front and rear direction.

A plurality of elastic members 440 may be provided. The plurality of elastic members 440 may be coupled to the first support plate 411 and the second support plate 412 at different positions.

In the illustrated embodiment, the elastic member 440 includes a first elastic member 440*a* and a first support plate 411 coupled to upper corners of the first support plate 411 and the second support plate 412, respectively, and second elastic members 440*b* each coupled to the lower corner of the second support plate 412.

In addition, a plurality of first elastic members 440*a* and a plurality of second elastic members 440*b* may be provided, respectively, and coupled to the first support plate 411 and the second support plate 412 at different positions, respectively.

In the illustrated embodiment, six first elastic members 440*a* and six second elastic members 440*b* are provided, respectively and are spaced apart from each other in the direction in which the first and second support plates 411 and 412 extend, that is, in the left and right direction and placed side by side.

In this case, the first and second elastic members 440*a* and 440*b* may be positioned adjacent to the energization block 420 and the shorting block 430.

In the illustrated embodiment, the first elastic member 440*a* is positioned above the energization block 420 and the shorting block 430. In addition, the second elastic member 440*b* is positioned below the energization block 420 and the shorting block 430.

In other words, the elastic member 440 is positioned to overlap the energization block 420 and the shorting block 430 in the up and down direction. In one embodiment, the elastic member 440 may be positioned in the middle portion of each extending direction of the energization block 420 and the shorting block 430, that is, the left and right direction in the illustrated embodiment.

Accordingly, the restoring force stored by the elastic member 440 may be transferred to a position adjacent to the energization block 420 and the shorting block 430 among the first and second support plates 411 and 412. As a result, contact reliability between the energization block 420 and the shorting block 430 may be improved.

The size of the restoring force stored by the elastic member 440 may be adjusted according to the distance between the first support plate 411 and the second support plate 412 or the length of the space portion 413 in the width direction (that is, length in the front and rear direction).

As will be described later, the cam member 460 is rotatably accommodated in the space portion 413 and comes into contact with the first and second support plates 411 and 412, respectively. In addition, the cam member 460 is formed with different lengths in the left and right direction and the front and rear direction of the cross section thereof.

Accordingly, as the cam member 460 rotates, the distance between the first and second support plates 411 and 412 and the length of the elastic member 440 change. Accordingly, the magnitude of the restoring force stored by the elastic member 440 may be changed.

Figure 3:
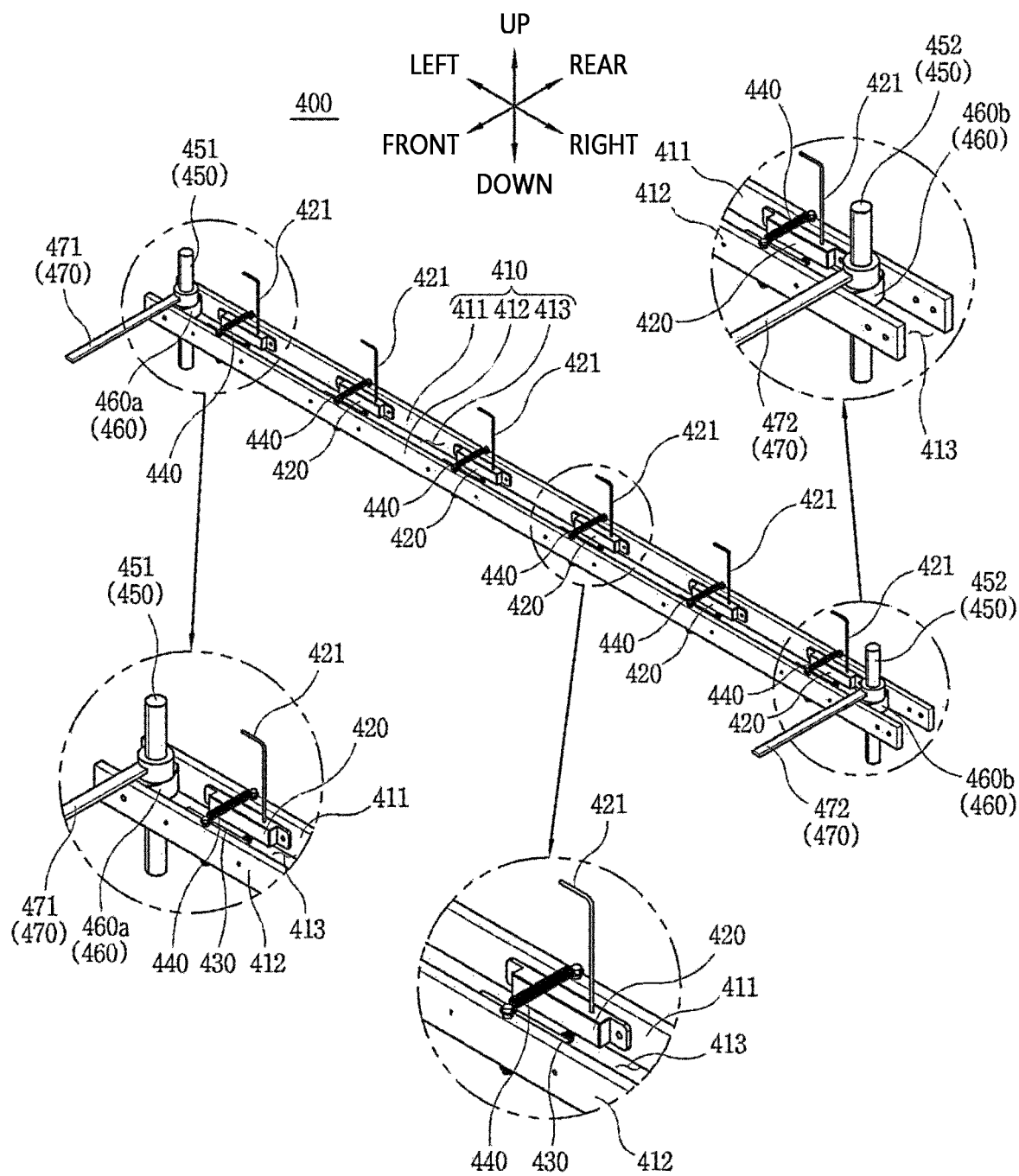
FIG. 3 is a perspective view illustrating a grounding mechanism according to an embodiment of the present disclosure.
Figure 4:
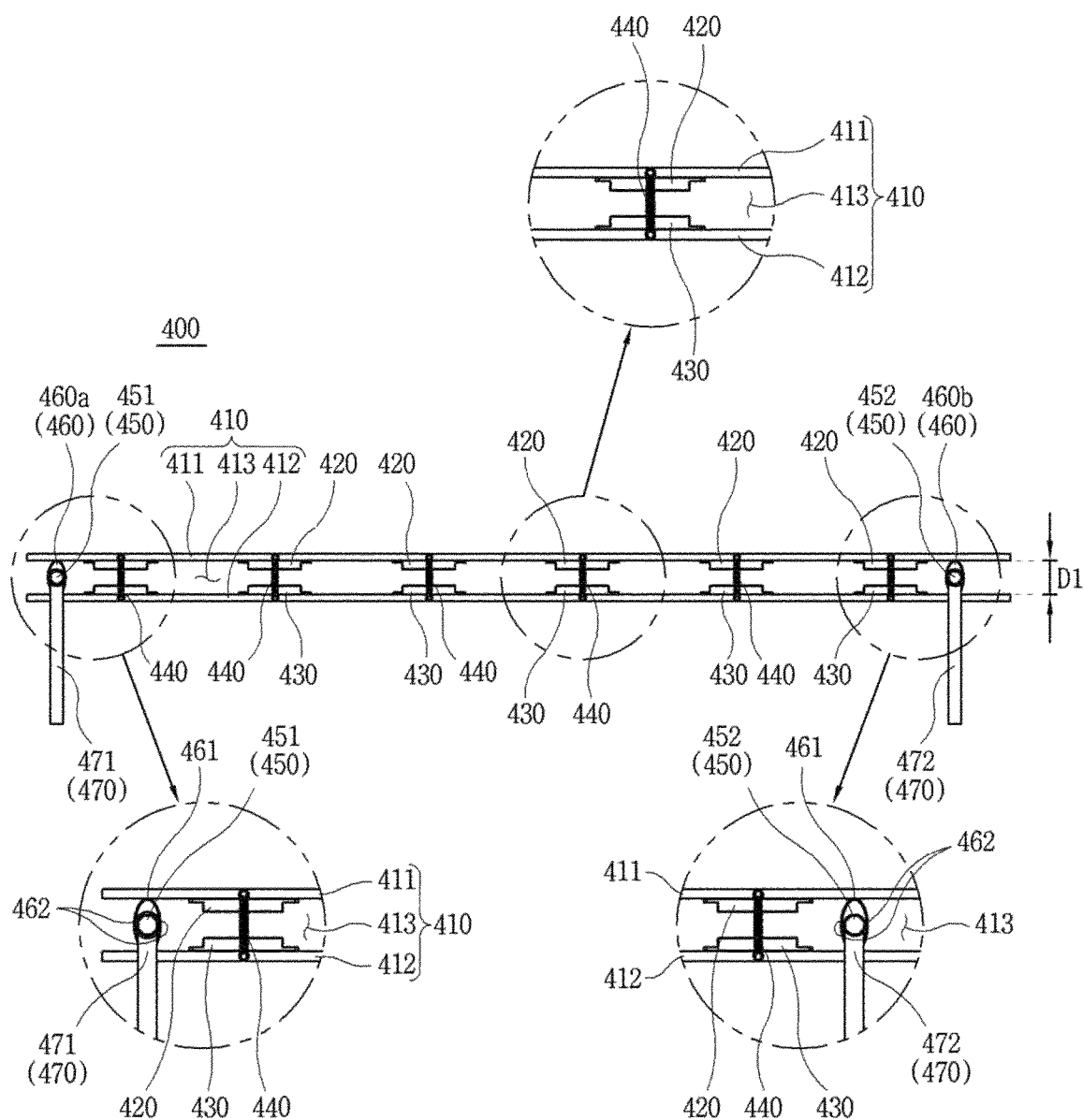
FIG. 4 is a plan view illustrating a grounding mechanism according to an embodiment of the present disclosure.
Figure 5:
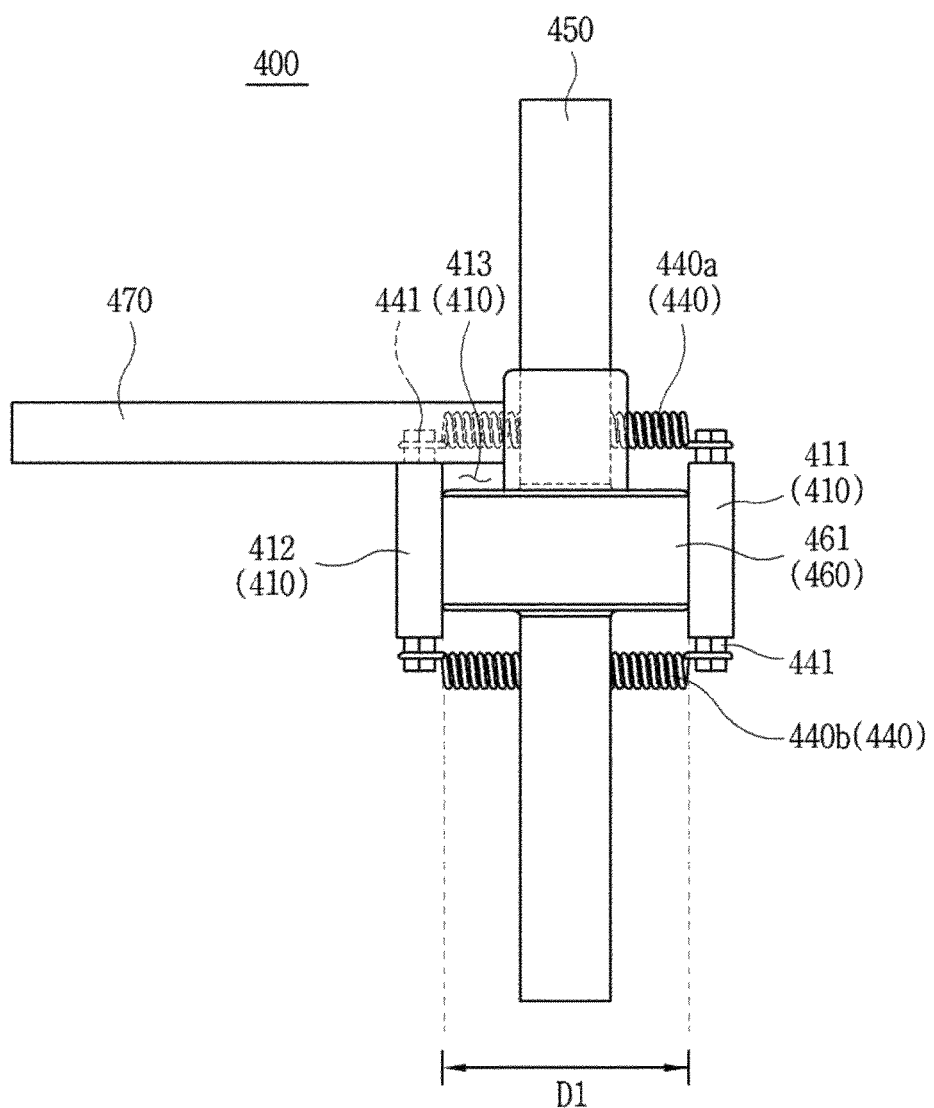
FIG. 5 is a side view illustrating a grounding mechanism according to an embodiment of the present disclosure.

In the embodiment illustrated in FIGS. 3 to 5, the energization block 420 and the shorting block 430 are spaced apart from each other by the cam member 460. In this case, the distance between the first support plate 411 and the second support plate 412 may be defined as the first distance D1.

In this state, it will be understood that the elastic member 440 is extended and the shape is deformed to store restoring force.

Figure 6:
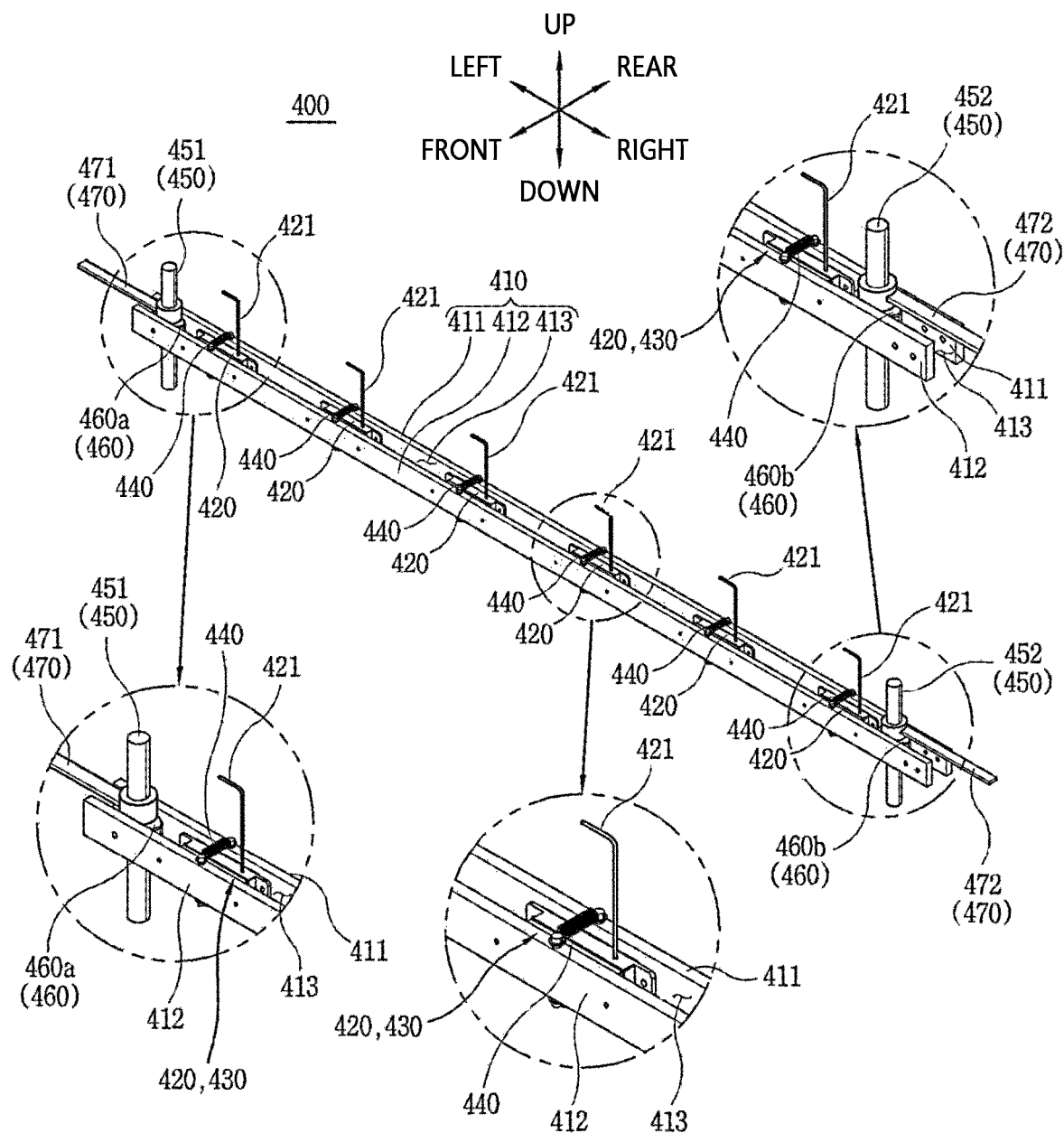
FIG. 6 is a perspective view illustrating a grounding mechanism according to an embodiment of the present disclosure.
Figure 7:
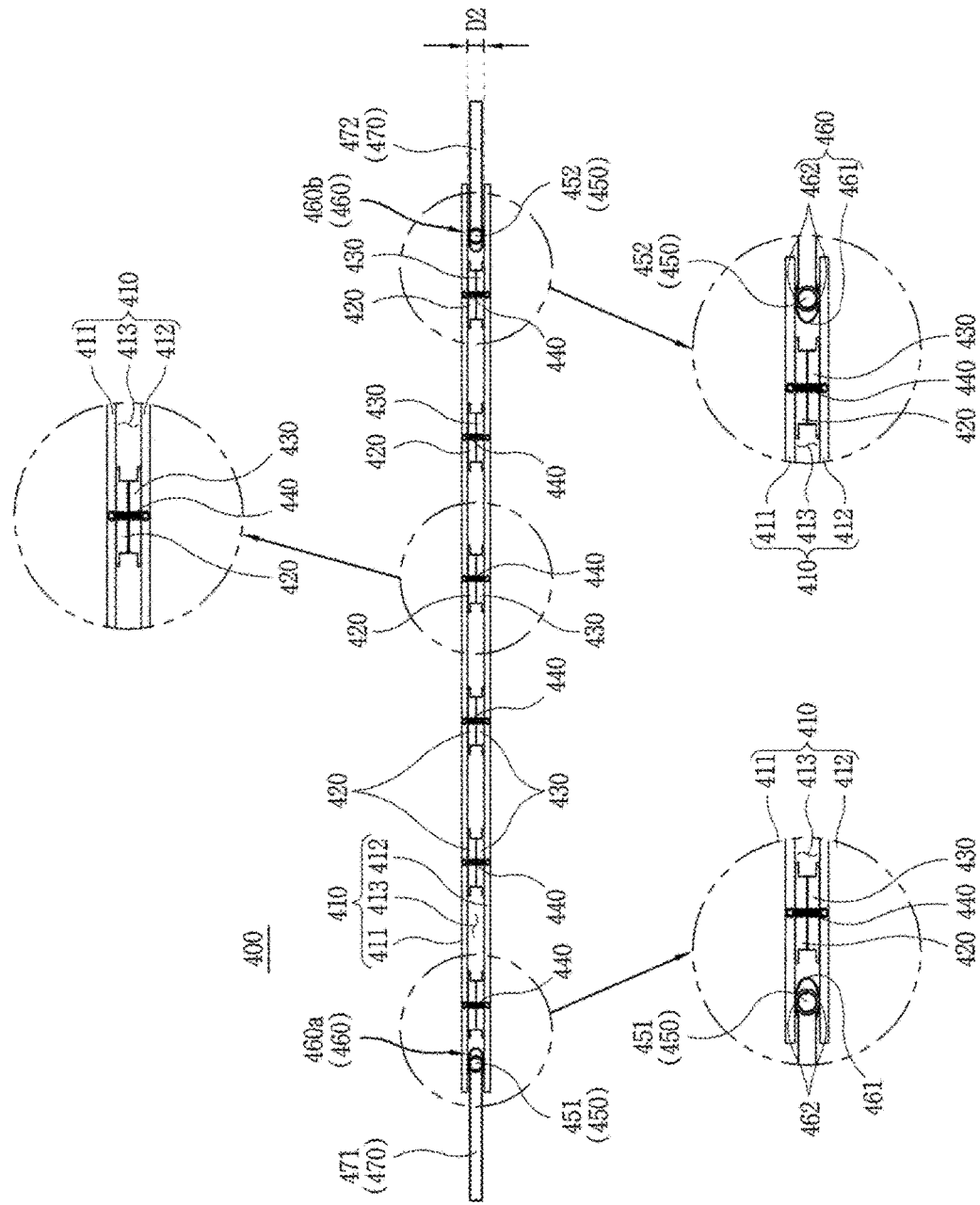
FIG. 7 is a plan view illustrating a grounding mechanism according to an embodiment of the present disclosure.
Figure 8:
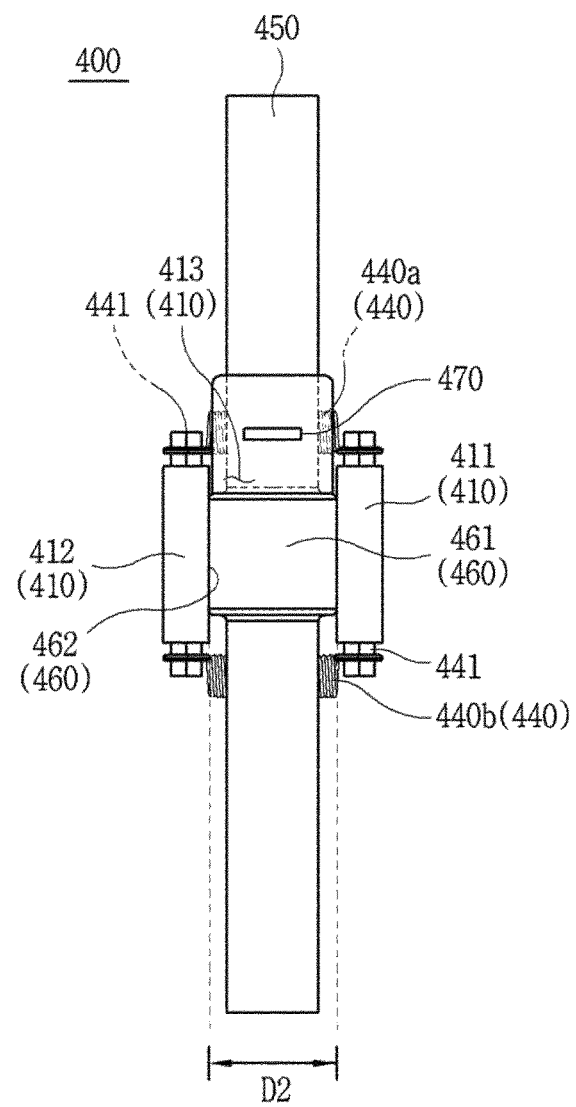
FIG. 8 is a side view illustrating a grounding mechanism according to an embodiment of the present disclosure.

In the embodiment illustrated in FIGS. 6 to 8, the energization block 420 and the shorting block 430 are in contact with each other by the cam member 460. In this case, the distance between the first support plate 411 and the second support plate 412 may be defined as the second distance D2. At this time, the second distance D2 is shorter than the first distance D1.

In this state, it will be understood that the elastic member 440 stores a smaller restoring force than the state illustrated in FIGS. 3 to 5.

At this time, it will be understood that the direction of the restoring force stored in the elastic member 440 in each state is the direction in which the first support plate 411 and the second support plate 412 are pulled, that is, toward the rear side.

The elastic member 440 is provided with a fixing portion 441. The fixing portion 441 couples the elastic member 440 to the first support plate 411 and the second support plate 412, respectively.

A plurality of fixing portions 441 may be provided. The plurality of fixing portions 441 may couple the elastic member 440 to the support portion 410 at different positions. In the illustrated embodiment, the fixing portion 441 is coupled to the elastic member 440 on the upper and lower sides of the first support plate 411 and the upper and lower sides of the second support plate 412, respectively.

The number of fixing portions 441 may be provided as many as the number of elastic members 440. In addition, the fixing portion 441 may be coupled to each of the plurality of elastic members 440. In the illustrated embodiment, one group of fixing portions 441 (that is, four fixing portions) is provided with six, and is spaced apart from each other in the left and right direction.

The shaft member 450 is coupled to the cam member 460 and functions as a central shaft around which the cam member 460 rotates. In addition, the handle member 470 is coupled to the shaft member 450 so that the handle member 470 can be rotated as the handle member 470 is rotated.

The shaft member 450 is coupled to the support portion 410. Specifically, the shaft member 450 is rotatably accommodated in the space portion 413. The outer side of the shaft member 450 may be partially surrounded by the first support plate 411 and the second support plate 412.

The shaft member 450 is spaced apart from the first support plate 411 and the second support plate 412. A cam member 460 is positioned in a space formed between the shaft member 450 and the first support plate 411 and the second support plate 412.

Shaft member 450 is formed extending in one direction, that is, the up and down direction in the illustrated embodiment. Each end of the shaft member 450 in of the extension direction is rotatably coupled to the support frame 23. In other words, the shaft member 450 is rotatably supported by the support frame 23.

In the illustrated embodiment, the shaft member 450 has a circular cross-section and has a cylindrical shape extending in the vertical direction. The shaft member 450 may be rotatably accommodated in the space portion 413 and may have an arbitrary shape that can be rotated together by being coupled with the cam member 460 and the handle member 470.

A plurality of shaft members 450 may be provided. A plurality of shaft members 450 may be rotatably accommodated in the space portion 413 at different positions. In the illustrated embodiment, the plurality of shaft members 450 are positioned adjacent to each end in the direction in which the support portion 410 extends, that is, in the left and right direction.

In other words, the shaft member 450 includes a first shaft 451 positioned adjacent to the left end of the support portion 410 and a second shaft 452 positioned adjacent to the right end of the support portion 410.

The shaft member 450 is connected to the cam member 460. When the shaft member 450 is rotated, the cam member 460 may also be rotated. In the illustrated embodiment, the shaft member 450 is coupled through a through-hole formed inside the cam member 460.

The shaft member 450 is connected to the handle member 470. When the handle member 470 is rotated, the shaft member 450 may also be rotated. In the illustrated embodiment, the shaft member 450 is coupled through a through-hole formed inside the handle member 470.

The cam member 460 is rotated together with the shaft member 450 to adjust the distance between the first support plate 411 and the second support plate 412. Due to the rotation of the cam member 460 and the elastic member 440, the energization block 420 and the shorting block 430 may come into contact or be separated from each other.

The cam member 460 is coupled to the shaft member 450. The cam member 460 may rotate together with the shaft member 450. In the illustrated embodiment, the shaft member 450 is through-coupled to the through-hole formed inside the cam member 460.

The cam member 460 is rotatably accommodated in the space portion 413. The cam member 460 may contact the first support plate 411 and the second support plate 412, respectively.

At this time, since the elastic member 440 applies the restoring force in the direction toward the first support plate 411 to the second support plate 412, the outer surface of the cam member 460 is pressed by the first support plate 411 and the second support plate 412, respectively.

In addition, the cam member 460 may have a cross section having a length in one direction and a length in another direction different from each other.

In other words, in the cross section of the cam member 460, the length in the long direction (front and rear directions in the embodiment illustrated in FIG. 3) may be longer than the length in the short direction (left and right direction in the embodiment illustrated in FIG. 3). Accordingly, when the cam member 460 is rotated, the distance between the first support plate 411 and the second support plate 412 may be adjusted in the direction of the cross section of the cam member 460.

A plurality of cam members 460 may be provided. A plurality of cam members 460 may be rotatably accommodated in the space portion 413 at different positions. In addition, the plurality of cam members 460 may come into contact with the first support plate 411 and the second support plate 412 at different positions.

In the illustrated embodiment, the cam members 460 include a first cam member 460a positioned adjacent to the left end of the support portion 410 and a second cam member 460b positioned adjacent to the right end of the support portion 410.

The number and position of cam members 460 may be changed according to the number and position of shaft members 450.

As the plurality of cam members 460 are provided, it may be easier to adjust the distance between the first support plate 411 and the second support plate 412.

In addition, since the distance between the first support plate 411 and the second support plate 412 is adjusted at a plurality of positions, the first support plate 411 and the second support plate 412 may be kept constant in the extension direction of the support portion 410.

In the illustrated embodiment, the cross section of the cam member 460 is formed as an ellipse including a major axis and a minor axis. Accordingly, in the illustrated embodiment, the cam member 460 includes a first surface 461 and a second surface 462 having different curvatures.

The first surface 461 may be defined as an outer surface of the cam member 460 having a minor axis of the cam member 460 as a string. The first surface 461 forms a portion of the outer circumferential surface of the cam member 460.

A plurality of first surfaces 461 may be formed. In other words, a portion whose diameter is the minor axis of the cam member 460 may be symmetrically positioned with respect to the center of the cross section of the cam member 460. In the embodiment illustrated in FIG. 3, the first surface 461 forms front and rear outer circumferential surfaces of the cam member 460.

The first surface 461 is formed as a curved surface having a predetermined curvature. The curvature of the first surface 461 may be greater than the curvature of the second surface 462. In other words, the first surface 461 is more steeply curved than the second surface 462.

When the cam member 460 is rotated so that the first surface 461 comes into contact with the first support plate 411 and the second support plate 412, respectively, the distance between the first support plate 411 and the second support plate 412 is maximum.

In other words, in the above state, the distance between the first support plate 411 and the second support plate 412 becomes the first distance D1. Accordingly, the energization block 420 and the shorting block 430 are spaced apart from each other. In this state, it will be understood that the magnitude of the restoring force stored by the elastic member 440 is maximum.

The first face 461 is continuous with the second face 462.

The second surface 462 may be defined as an outer surface of the cam member 460 having a long axis of the cam member 460 as a diameter. The second surface 462 forms the remaining portion of the outer circumferential surface of the cam member 460.

A plurality of second surfaces 462 may be formed. In other words, a portion of which the major axis of the cam member 460 is a string may be symmetrically positioned with respect to the center of the cross section of the cam member 460. In the embodiment illustrated in FIG. 3, the second surface 462 forms the left and right outer circumferential surfaces of the cam member 460.

The second surface 462 is formed as a curved surface having a predetermined curvature. The curvature of the second surface 462 may be smaller than that of the first surface 461. In other words, the second surface 462 is more gently curved than the first surface 461.

When the cam member 460 is rotated so that the second surface 462 comes into contact with the first support plate 411 and the second support plate 412, respectively, the distance between the first support plate 411 and the second support plate 412 is minimum.

In other words, in the above state, the distance between the first support plate 411 and the second support plate 412 becomes the second distance D2. Accordingly, the energization block 420 and the shorting block 430 come into contact with each other. In this state, it will be understood that the magnitude of the restoring force stored by the elastic member 440 is minimized.

The first face 461 and the second face 462 are alternately continuous along the outer circumference of the cam member 460. In addition, any one of the first surface 461 and the second surface 462 is in contact with the first support plate 411 and the second support plate 412, respectively.

The handle member 470 is coupled to the shaft member 450 and rotates together. The handle member 470 can be manipulated automatically or manually.

The handle member 470 may be rotated clockwise or counterclockwise by a predetermined angle. Accordingly, the shaft member 450 connected to the handle member 470 and the cam member 460 connected to the shaft member 450 may also be rotated clockwise or counterclockwise by a predetermined angle.

At this time, it is preferable that the predetermined angle is determined so that, as the handle member 470 rotates, the first surface 461 and the second surface 462 of the cam member 460 alternately contact the first support plate 411 and the second support plate 412.

As described above, in one embodiment, the cross section of the cam member 460 may be formed in an elliptical shape having a major axis and a minor axis. In the above embodiment, the predetermined angle at which the handle member 470 is rotated may be a right angle.

A member (not illustrated) for limiting rotation may be provided on the handle member 470. The member (not illustrated) may restrain the handle member 470 such that the handle member 470 is rotated only by the predetermined angle. For example, the member (not illustrated) may be provided in the form of a pin, a clip, or a wedge, each provided at the limit of the rotation angle of the handle member 470.

The handle member 470 may include a first portion through which the shaft member 450 is coupled, and a second portion continuous with the first portion and extending in a direction opposite to the first portion.

In other words, it will be understood that the first portion is a portion where the handle member 470 is coupled to the shaft member 450, and the second portion is a portion that is gripped and rotated by a worker or the like.

A plurality of handle members 470 may be provided. A plurality of handle members 470 may be coupled to different shaft members 450. In the illustrated embodiment, the handle member 470 includes a first handle member 471 coupled to a first shaft 451 and a second handle member 472 coupled to a second shaft 452.

Accordingly, the handle member 470 may be rotated at a plurality of positions, and the cam member 460 may be rotated at a plurality of positions.

The handle member 470 can be rotated either automatically or manually. It is assumed that the handle member 470 in the illustrated embodiment is manually manipulated by a worker.

Alternatively, a separate link member (not illustrated) may be provided so that the plurality of handle members 470 are connected to each other. In the above embodiment, rotation of the plurality of handle members 470 may be interlocked.

A detailed description of a process of simultaneously shorting or opening the plurality of capacitor assemblies 100 by rotating the handle member 470 will be described later.

Figure 9:
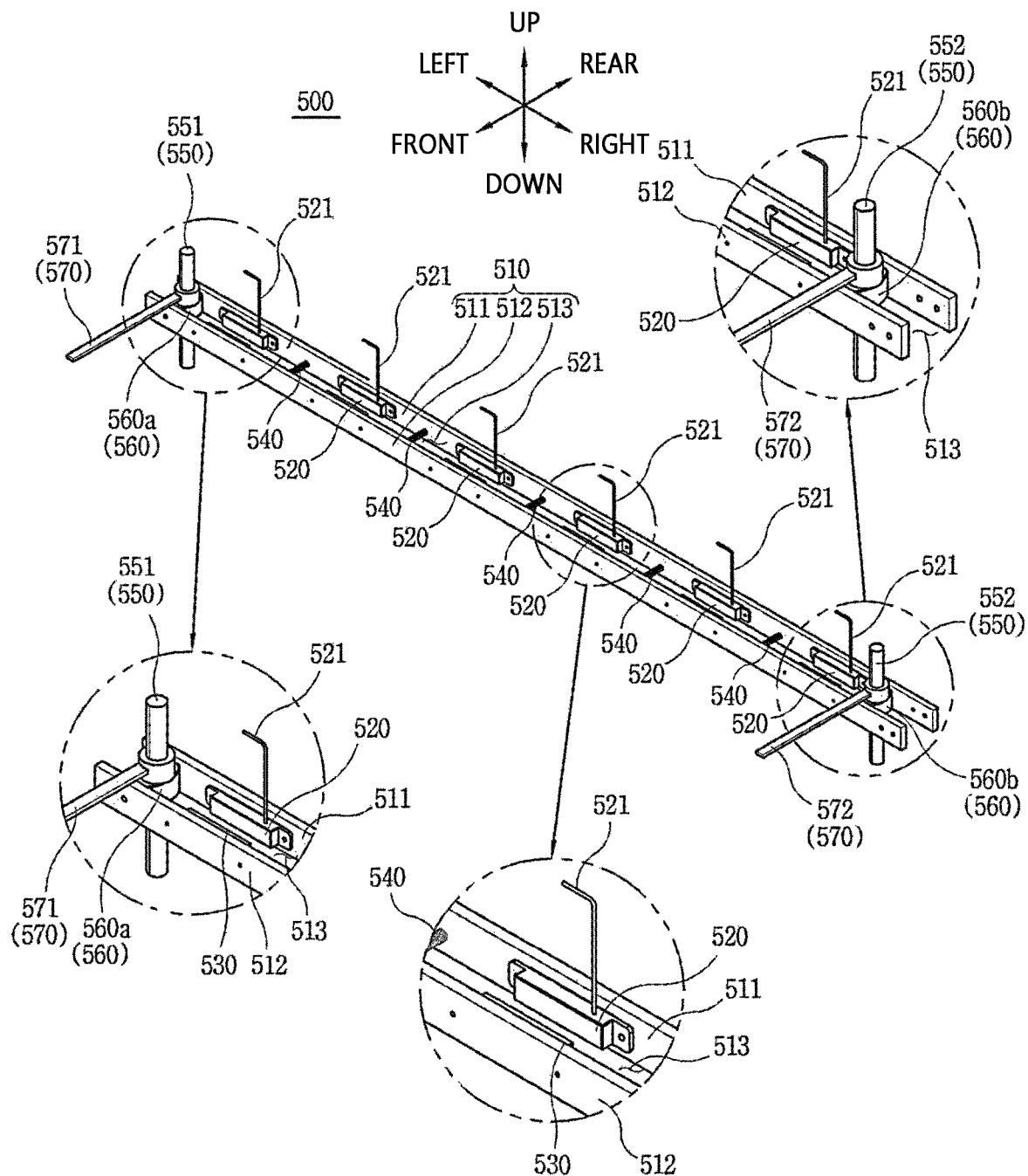
FIG. 9 is a perspective view illustrating a grounding mechanism according to another embodiment of the present disclosure.
Figure 10:
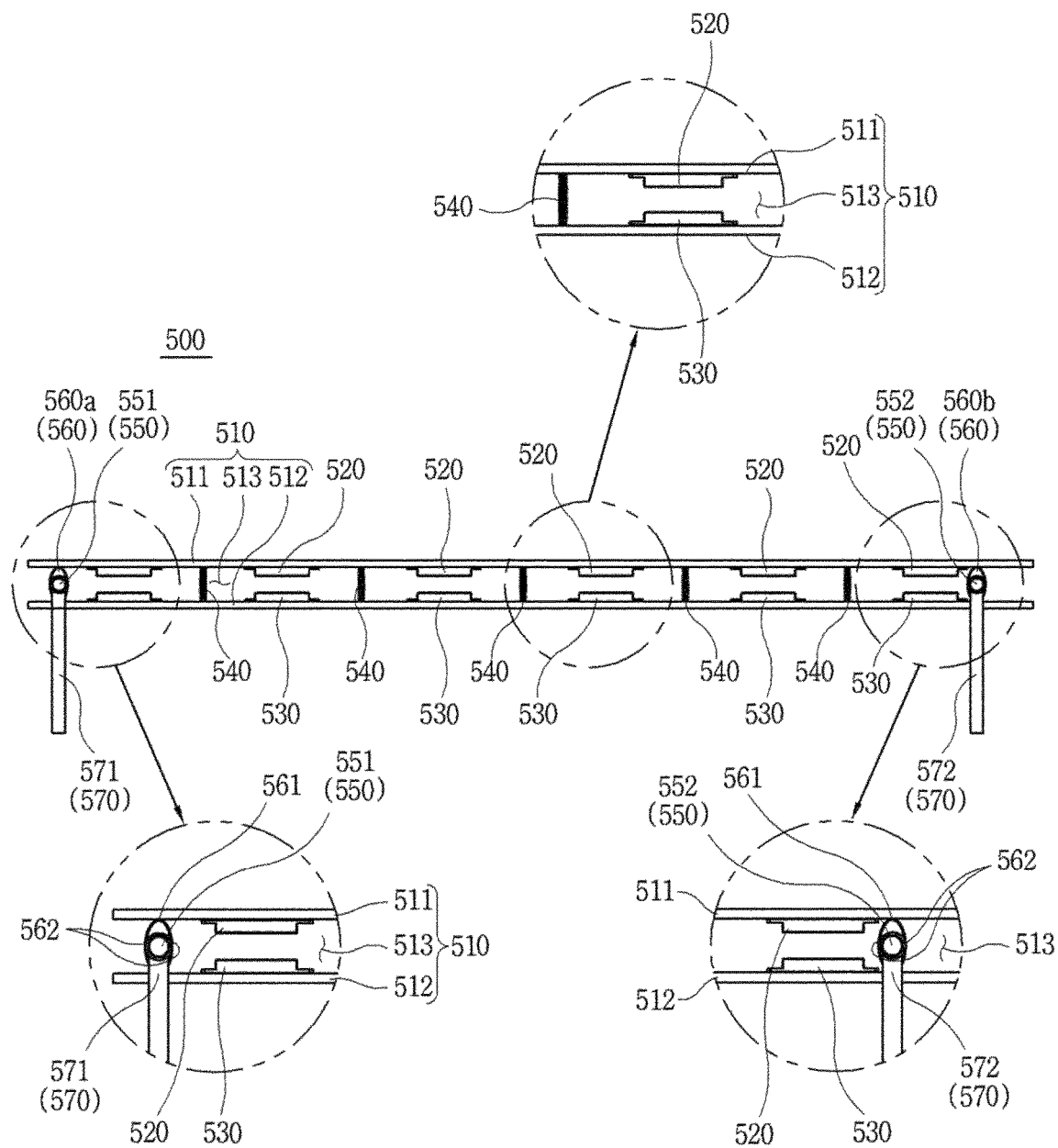
FIG. 10 is a plan view illustrating a grounding mechanism according to another embodiment of the present disclosure.

(2) Description of Short Circuit Regulating Device 500 According to Another Embodiment of Present Disclosure Referring to FIGS. 9 to 10, a short circuit regulating device 500 according to another embodiment of the present disclosure is illustrated.

In the illustrated embodiment, the short circuit regulating device 500 includes a support portion 510, an energization block 520, a shorting block 530, an elastic member 540, a shaft member 550, a cam member 560, and a handle member 570.

Compared with the short circuit regulating device 400 according to the above-described embodiment, the short circuit regulating device 500 according to the present embodiment has a difference in structure and shape of the elastic member 540.

In other words, the support portion 510, the energization block 520, the shorting block 530, the shaft member 550, the cam member 560, and the handle member 570 provided in the short circuit regulating device 500 according to the present embodiment have the same structure, shape, and function as the support portion 410, the energization block 420, the shorting block 430, the shaft member 450, the cam member 460, and the handle member 470 according to the above-described embodiment.

Therefore, in the following description, the short circuit regulating device 500 according to the present embodiment will be described with the elastic member 540 as the center.

The elastic member 540 provides force for moving the second supporting plate 512 and the shorting block 530 coupled thereto toward the first supporting plate 511 and the energization block 520 coupled thereto.

The elastic member 540 stores restoring force by shape deformation and transfers the stored restoring force to the support portion 510.

As described above, since the first support plate 511 is fixedly coupled to the support frame 23, it will be understood that the second support plate 512 is moved by the restoring force provided by the elastic member 540.

In other words, the elastic member 540 applies a restoring force to the support portion 510 in a direction in which the energization block 520 and the shorting block 530 move toward each other. Accordingly, it may be said that the elastic member 540 elastically supports the first support plate 511 and the second support plate 512.

The elastic member 540 is coupled to the support portion 510. Specifically, the elastic member 540 has one side coupled to the first support plate 511 and the other side coupled to the second support plate 512. Therefore, the restoring force stored and provided by the elastic member 540 may be determined by the distance between the first support plate 511 and the second support plate 512 or the width of the space portion 513 formed therebetween.

In the illustrated embodiment, the elastic member 540 is coupled to each surface of the first support plate 511 and the second support plate 512 facing each other, that is, the front surface of the first support plate 511 and the rear surface of the second support plate 512, respectively. In this embodiment, the elastic member 540 is accommodated in the space portion 513.

The elastic member 540 may be provided in any form capable of storing restoring force by shape deformation and transmitting the stored restoring force to other members. In the illustrated embodiment, the elastic member 540 is provided as a coil spring extending in the front and rear direction.

A plurality of elastic members 540 may be provided. The plurality of elastic members 540 may be coupled to the first support plate 511 and the second support plate 512 at different positions, respectively. The plurality of elastic members 540 are spaced apart from each other in the direction in which the support portion 510 extends.

In the illustrated embodiment, five elastic members 540 are provided and positioned between the plurality of energization blocks 520, respectively. In other words, five elastic members 540 are provided and positioned between the plurality of shorting blocks 530, respectively.

In other words, the elastic member 540 is positioned to surround the energization block 520 and the shorting block 530 from both sides. In one embodiment, the elastic member 540 may be positioned in a middle portion of a space formed by the plurality of energization blocks 520 or the plurality of shorting blocks 530 being spaced apart from each other.

Accordingly, the restoring force stored by the elastic member 540 may be transferred to a position adjacent to the energization block 520 and the shorting block 530 among the first and second support plates 511 and 512. As a result, contact reliability between the energization block 520 and the shorting block 530 may be improved.

The size of the restoring force stored by the elastic member 540 may be adjusted according to the distance between the first support plate 511 and the second support plate 512 or the length of the space portion 513 in the width direction (that is, length in the front and rear direction).

As described above, the cam member 560 is rotatably accommodated in the space portion 513 and comes into contact with the first and second support plates 511 and 512, respectively. In addition, the cam member 560 is formed with different lengths in the left and right direction and the front and rear direction of the cross section thereof.

Accordingly, as the cam member 560 rotates, the distance between the first and second support plates 511 and 512 and the length of the elastic member 540 change. Accordingly, the magnitude of the restoring force stored by the elastic member 540 may be changed.

In the embodiment illustrated in FIGS. 9 to 10, the energization block 520 and the shorting block 530 are spaced apart from each other by the cam member 560. In this case, the distance between the first support plate 511 and the second support plate 512 may be defined as the first distance D1.

In this state, it will be understood that the elastic member 540 is extended and the shape is deformed to store restoring force.

Although not illustrated, as described above, when the energization block 520 and the shorting block 530 are in contact with each other by the cam member 560, a distance between the first support plate 511 and the second support plate 512 may be defined as the second distance D2. At this time, the second distance D2 is shorter than the first distance D1.

In the above state, it will be understood that the elastic member 540 stores a smaller restoring force than the state illustrated in FIGS. 9 to 10.

In addition, in the above state, the length of the elastic member 540, that is, the length in the front and rear direction is equal to or less than the sum of the thicknesses of the energization block 520 and the shorting block 530. Accordingly, the position of the elastic member 540 does not affect the contact between the energization block 520 and the shorting block 530.

At this time, it will be understood that the direction of the restoring force stored in the elastic member 540 in each state is the direction in which the first support plate 511 and the second support plate 512 are pulled, that is, toward the rear side.

Figure 11:
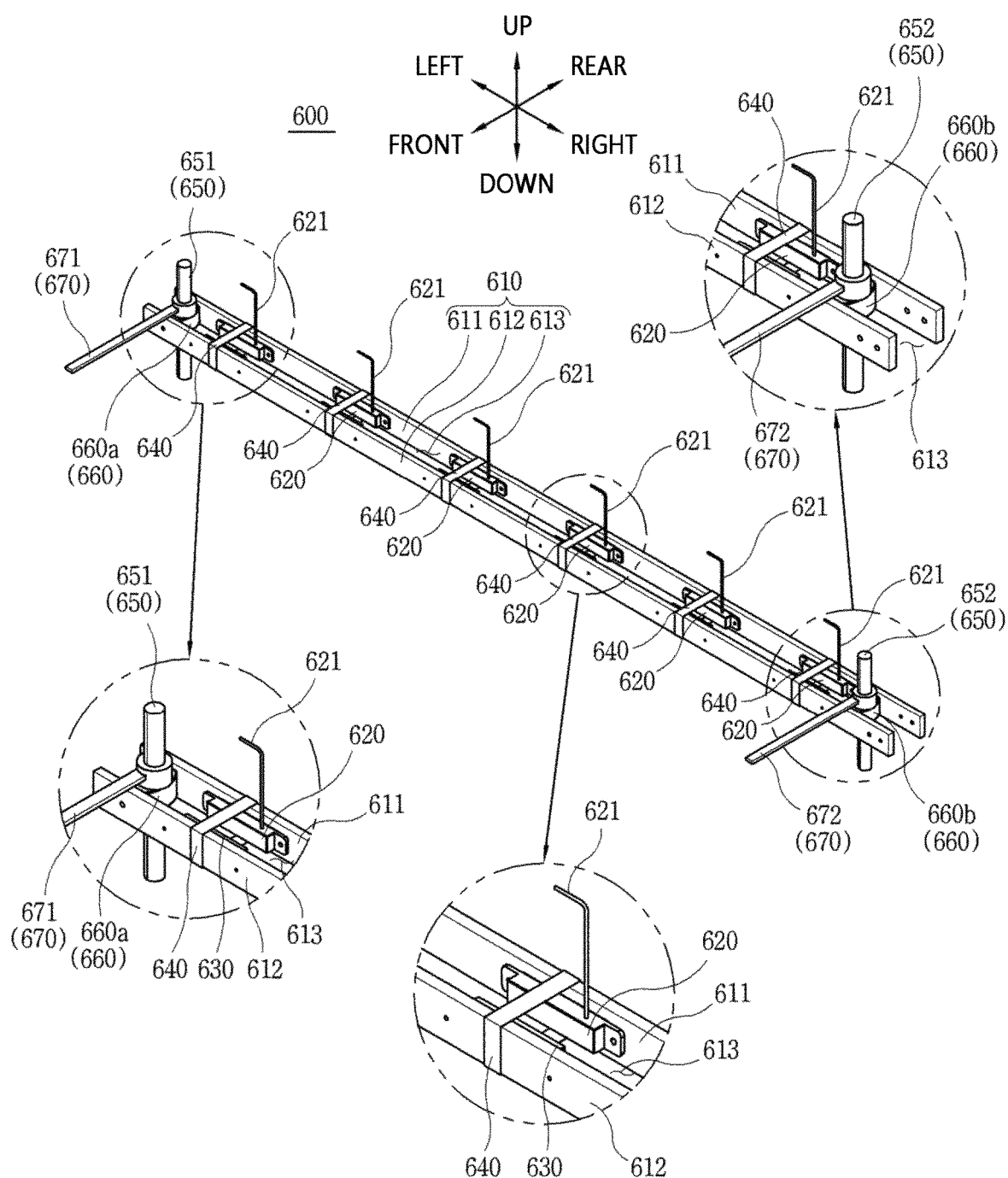
FIG. 11 is a perspective view illustrating a grounding mechanism according to another embodiment of the present disclosure.
Figure 12:
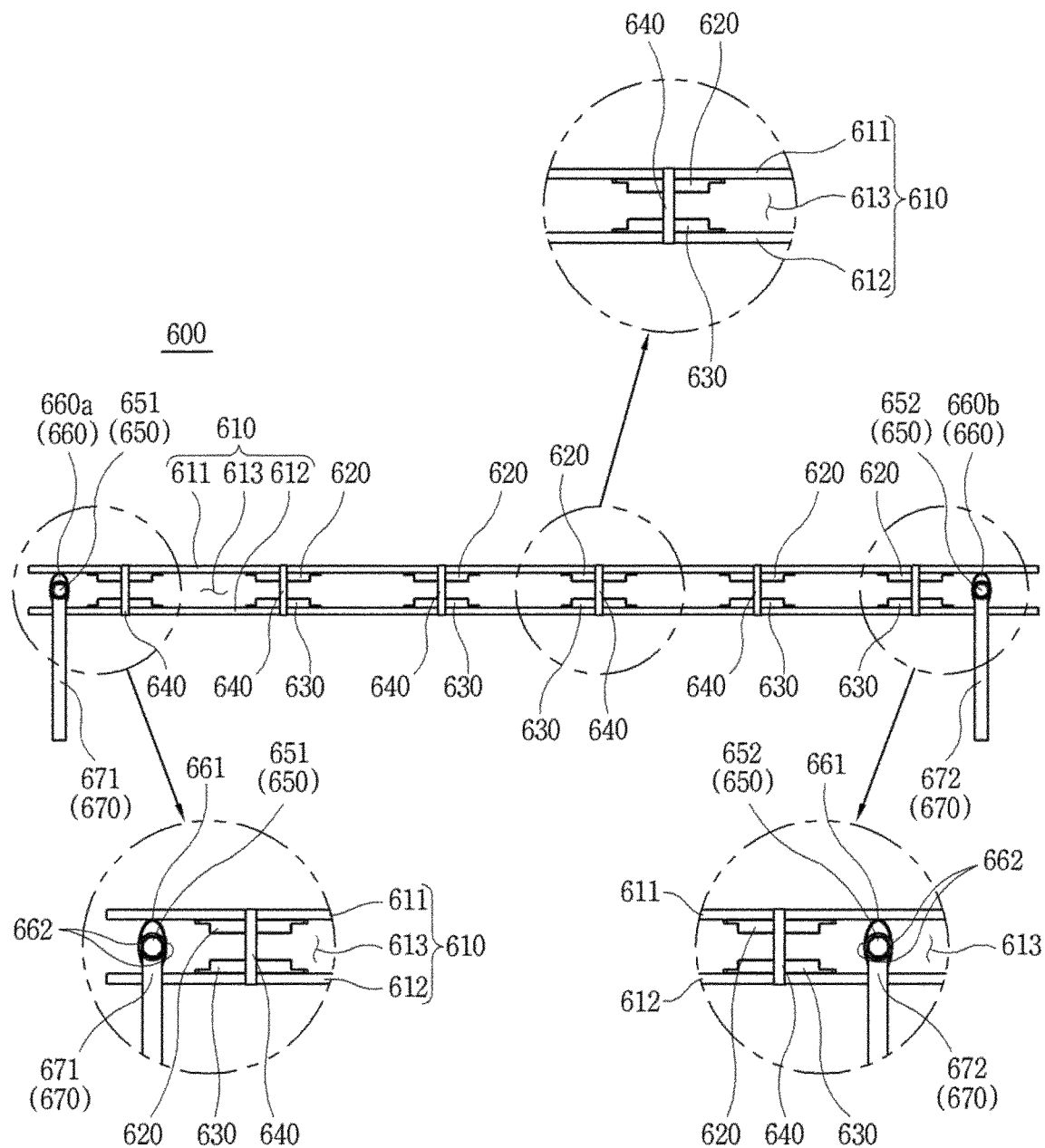
FIG. 12 is a plan view illustrating a grounding mechanism according to another embodiment of the present disclosure.

(3) Description of Short Circuit Regulating Device 600 According to Another Embodiment of Present Disclosure Referring to FIGS. 11 and 12, a short circuit regulating device 600 according to another embodiment of the present disclosure is illustrated.

In the illustrated embodiment, the short circuit regulating device 600 includes a support portion 610, an energization block 620, a shorting block 630, an elastic member 640, a shaft member 650, a cam member 660, and a handle member 670.

Compared with the short circuit regulating devices 400 and 500 according to the above-described embodiments, the short circuit regulating device 600 according to the present embodiment has a difference in structure and shape of the elastic member 640.

In other words, the support portion 610, the energization block 620, the shorting block 630, the shaft member 650, the cam member 660, and the handle member 670 provided in the short circuit regulating device 600 according to the present embodiment have the same structure, shape, and function as the support portions 410 and 510, the energization blocks 420 and 520, the shorting blocks 430 and 530, the shaft members 450 and 550, the cam members 460 and 560, and the handle members 470 and 570 according to the above-described embodiments.

Therefore, in the following description, the short circuit regulating device 600 according to the present embodiment will be described with the elastic member 640 as the center.

The elastic member 640 provides a force for moving the second support plate 612 and the shorting block 630 coupled thereto toward the first support plate 611 and the energization block 620 coupled thereto.

The elastic member 640 stores restoring force by shape deformation and transfers the stored restoring force to the support portion 610.

As described above, since the first support plate 611 is fixedly coupled to the support frame 23, it will be understood that the second support plate 612 is moved by the restoring force provided by the elastic member 640.

In other words, the elastic member 640 applies a restoring force to the support portion 610 in a direction in which the energization block 620 and the shorting block 630 move toward each other. Accordingly, it may be said that the elastic member 640 elastically supports the first support plate 611 and the second support plate 612.

The elastic member 640 is coupled to the support portion 610. Specifically, the elastic member 640 is coupled to surround the first support plate 611 and the second support plate 612. Therefore, the restoring force stored and provided by the elastic member 640 may be determined by the distance between the first support plate 611 and the second support plate 612 or the width of the space portion 613 formed therebetween.

In the illustrated embodiment, the elastic member 640 is formed to surround the upper and lower sides of the space portion 613, the rear surface of the first support plate 611, and the front surface of the second support plate 612.

In the above embodiment, the elastic member 640 may be provided in the form of a band formed of an elastic material having elasticity such as rubber or latex.

A plurality of elastic members 640 may be provided. The plurality of elastic members 640 may be coupled to the support portion 610 at different positions, respectively. The plurality of elastic members 640 are spaced apart from each other in the direction in which the support portion 610 extends.

In the illustrated embodiment, six elastic members 640 are provided, and the first and second support plates 611 and 612 are spaced apart from each other and arranged side by side in the extending direction, that is, in the left and right direction.

In this case, the elastic member 640 may be positioned adjacent to the energization block 620 and the shorting block 630.

In the illustrated embodiment, the elastic member 640 is positioned to surround the upper and lower sides of the energization block 620 and the shorting block 630.

In other words, the elastic member 640 is overlapped with the energization block 620 and the shorting block 630 in the up and down direction. In one embodiment, the elastic member 640 may be positioned in the middle portion of each extending direction of the energization block 620 and the shorting block 630, that is, the left and right direction in the illustrated embodiment.

Therefore, the restoring force stored by the elastic member 640 may be transmitted to a position adjacent to the energization block 620 and the shorting block 630 among the first and second support plates 611 and 612. As a result, contact reliability between the energization block 620 and the shorting block 630 may be improved.

The size of the restoring force stored by the elastic member 640 may be adjusted according to the distance between the first support plate 611 and the second support plate 612 or the length of the space portion 613 in the width direction (that is, length in the front and rear direction).

As described above, the cam member 660 is rotatably accommodated in the space portion 613 and comes into contact with the first and second support plates 611 and 612, respectively. In addition, the cam member 660 is formed with different lengths in the left and right direction and in the front and rear directions of the cross section thereof.

Accordingly, as the cam member 660 rotates, the distance between the first and second support plates 611 and 612 and the length of the elastic member 640 change. Accordingly, the size of the restoring force stored by the elastic member 640 may be changed.

In the embodiment illustrated in FIGS. 11 to 12, the energization block 620 and the shorting block 630 are spaced apart from each other by the cam member 660. In this case, the distance between the first support plate 611 and the second support plate 612 may be defined as the first distance D1.

In this state, it will be understood that the elastic member 640 is extended and the shape is deformed to store restoring force.

Although not illustrated, as described above, when the energization block 620 and the shorting block 630 are in contact with each other by the cam member 660, a distance between the first supporting plate 611 and the second supporting plate 612 may be defined as the second distance D2. At this time, the second distance D2 is shorter than the first distance D1.

In this state, it will be understood that the elastic member 640 stores a restoring force smaller than the state illustrated in FIGS. 11 to 12.

At this time, it will be understood that the direction of the restoring force stored in the elastic member 640 in each state is the direction in which the first support plate 611 and the second support plate 612 are pulled, that is, toward the rear side.

Figure 13:
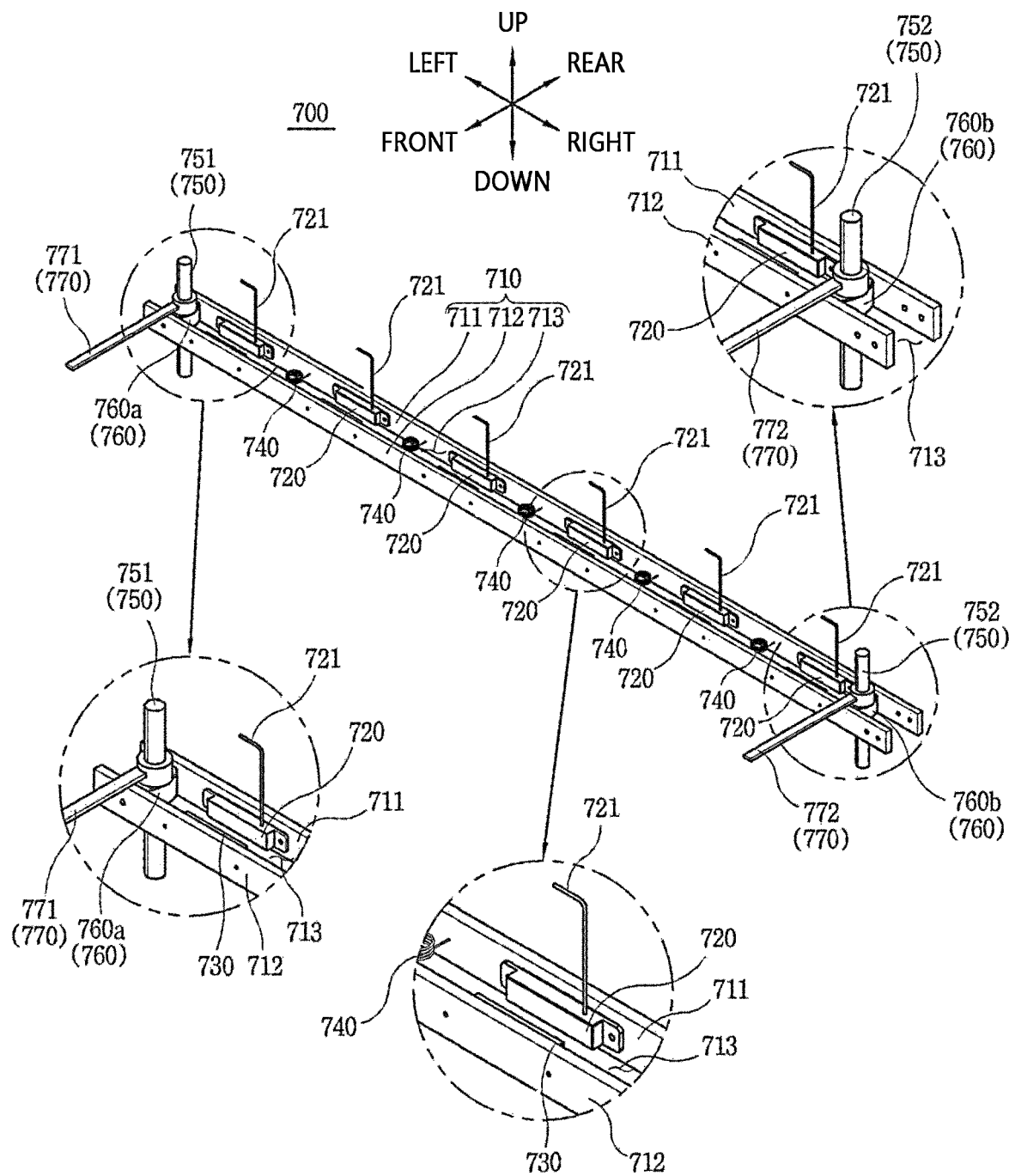
FIG. 13 is a perspective view illustrating a grounding mechanism according to another embodiment of the present disclosure.
Figure 14:
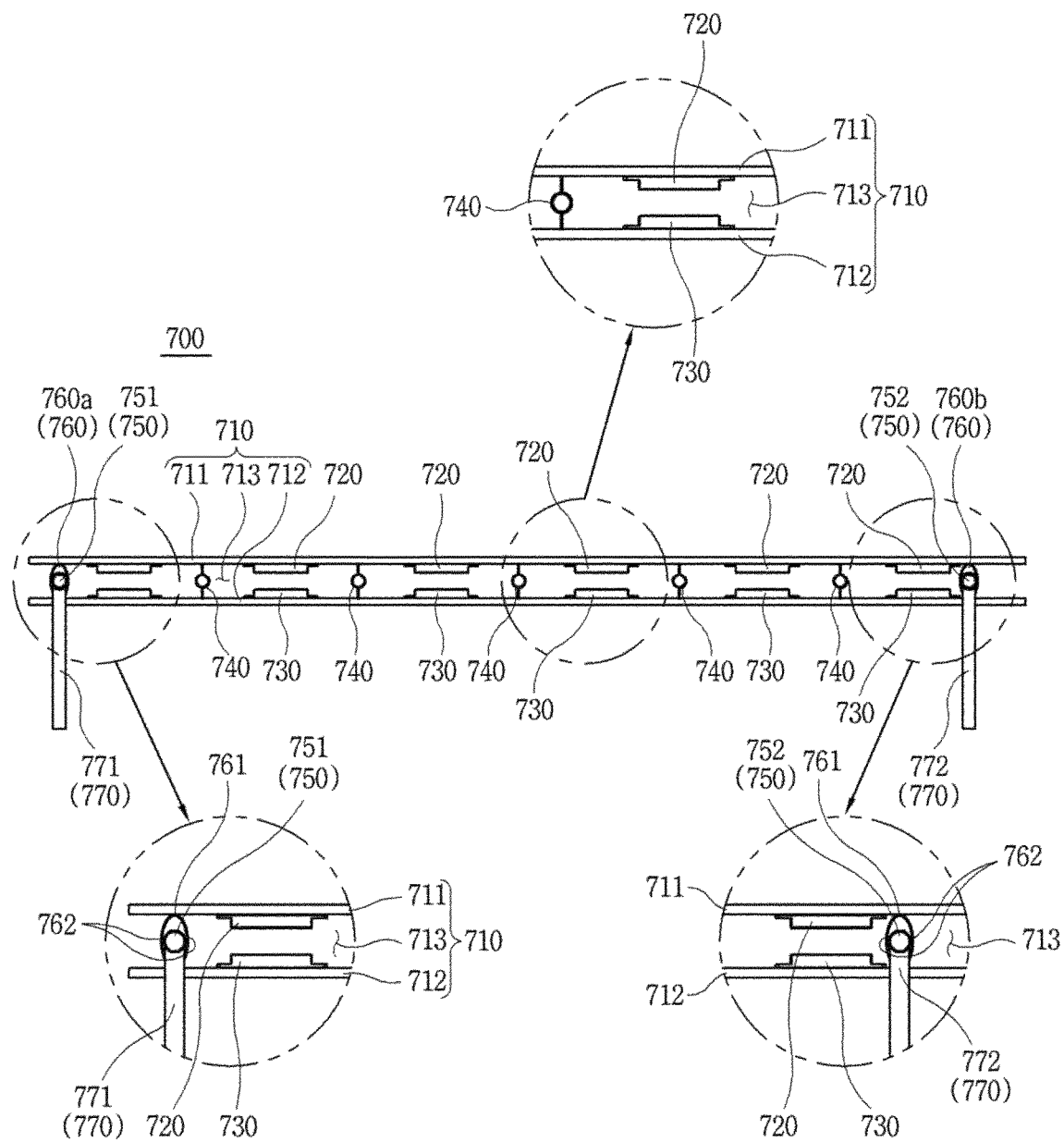
FIG. 14 is a plan view illustrating a grounding mechanism according to another embodiment of the present disclosure.

(4) Description of Short Circuit Regulating Device 700 According to Another Embodiment of Present Disclosure Referring to FIGS. 13 and 14, a short circuit regulating device 700 according to another embodiment of the present disclosure is illustrated.

In the illustrated embodiment, the shorting adjustment device 700 includes a support portion 710, an energization block 720, a shorting block 730, an elastic member 740, a shaft member 750, a cam member 760, and a handle member 770.

Compared with the short circuit regulating devices 400, 500, and 600 according to the above-described embodiment, the short circuit regulating device 700 according to the present embodiment has a difference in structure and shape of the elastic member 740.

In other words, the support portion 710, the energization block 720, the shorting block 730, the shaft member 750, the cam member 760, and the handle member 770 provided in the short circuit regulating device 700 according to the present embodiment have the same structure, shape, and function as the support portions 410, 510, and 610, the energization blocks 420, 520, and 620, the shorting blocks 430, 530, and 630, the shaft members 450, 550, and 650, and the cam members 460, 560, 660, and the handle members 470, 570, 670 according to the above-described embodiment.

Therefore, in the following description, the short circuit regulating device 700 according to the present embodiment will be described with the elastic member 740 as the center.

The elastic member 740 provides a force for moving the second support plate 712 and the shorting block 730 coupled thereto toward the first support plate 711 and the energization block 720 coupled thereto.

The elastic member 740 stores restoring force by shape deformation and transfers the stored restoring force to the support portion 710.

As described above, since the first support plate 711 is fixedly coupled to the support frame 23, it will be understood that the second support plate 712 is moved by the restoring force provided by the elastic member 740.

In other words, the elastic member 740 applies a restoring force in a direction in which the energization block 720 and the shorting block 730 move toward each other to the support portion 710. Accordingly, it may be said that the elastic member 740 elastically supports the first support plate 711 and the second support plate 712.

The elastic member 740 is coupled to the support portion 710. Specifically, the elastic member 740 has one side coupled to the first support plate 711 and the other side coupled to the second support plate 712. Therefore, the restoring force stored and provided by the elastic member 740 may be determined by the distance between the first support plate 711 and the second support plate 712 or the width of the space portion 713 formed therebetween.

In the illustrated embodiment, the elastic member 740 is coupled to each surface of the first support plate 711 and the second support plate 712 facing each other, that is, the front surface of the first support plate 711 and the rear surface of the second support plate 712, respectively.

The elastic member 740 may be provided in any form capable of storing restoring force by shape deformation and transmitting the stored restoring force to other members. In the illustrated embodiment, the elastic member 740 has a rear side end connected to the first support plate 711 and a front side end connected to the second support plate 712, respectively, and is provided as a torsion spring accommodated in the space portion 713.

A plurality of elastic members 740 may be provided. The plurality of elastic members 740 may be coupled to the first support plate 711 and the second support plate 712 at different positions. The plurality of elastic members 740 are spaced apart from each other in the direction in which the support portion 710 extends.

In the illustrated embodiment, five elastic members 740 are provided and positioned between the plurality of energization blocks 720, respectively. In other words, five elastic members 740 are provided and positioned between the plurality of shorting blocks 730, respectively.

In other words, the elastic member 740 is positioned to surround the energization block 720 and the shorting block 730 from both sides. In one embodiment, the elastic member 740 may be positioned in a middle portion of a space in which the plurality of energization blocks 720 or the plurality of shorting blocks 730 are spaced apart from each other.

Accordingly, the restoring force stored by the elastic member 740 may be transferred to a position adjacent to the energization block 720 and the shorting block 730 among the first and second support plates 711 and 712. As a result, contact reliability between the energization block 720 and the shorting block 730 may be improved.

The size of the restoring force stored by the elastic member 740 may be adjusted according to the distance between the first support plate 711 and the second support plate 712 or the length of the space portion 713 in the width direction (that is, the length in the front and rear direction).

As described above, the cam member 760 is rotatably accommodated in the space portion 713 and comes into contact with the first and second support plates 711 and 712, respectively. In addition, the cam member 760 is formed with different lengths in the left and right direction and the front and rear direction of the cross section thereof.

Accordingly, as the cam member 760 rotates, the distance between the first and second support plates 711 and 712 and the length of the elastic member 740 change. Accordingly, the magnitude of the restoring force stored by the elastic member 740 may be changed.

In the embodiment illustrated in FIGS. 13 to 14, the energization block 720 and the shorting block 730 are spaced apart from each other by the cam member 760. In this case, the distance between the first support plate 711 and the second support plate 712 may be defined as the first distance D1.

In this state, it will be understood that the elastic member 740 is extended and the shape thereof is deformed to store restoring force.

Although not illustrated, as described above, when the energization block 720 and the shorting block 730 are in contact with each other by the cam member 760, a distance between the first supporting plate 711 and the second supporting plate 712 may be defined as the second distance D2. At this time, the second distance D2 is shorter than the first distance D1.

In this state, it will be understood that the elastic member 740 stores a restoring force smaller than the state illustrated in FIGS. 13 to 14.

In addition, in the above state, the length between each end of the elastic member 740, that is, the length in the front and rear direction is equal to or less than the sum of the thicknesses of the energization block 720 and the shorting block 730. Accordingly, the position of the elastic member 740 does not affect the contact between the energization block 720 and the shorting block 730.

At this time, it will be understood that the direction of the restoring force stored in the elastic member 740 in each state is the direction in which the first support plate 711 and the second support plate 712 are pulled, that is, toward the rear side.

4. Description of Operation Process of Short Circuit Regulating Device 400, 500, 600, and 700 According to an Embodiment of Present Disclosure The modular multi-level converter 1 according to each embodiment of the present disclosure includes short circuit regulating devices 400, 500, 600, and 700. The short circuit regulating devices 400, 500, 600, and 700 are manipulated by an external force, so that the energization block 420, 520, 620, and 720 and the shorting block 430, 530, 630, and 730 may come into contact with or be separated from each other.

Therefore, the plurality of energization blocks 420, 520, 620, and 720 in contact with the plurality of shorting blocks 430, 530, 630, and 730 and the plurality of capacitor assemblies 100 energizably connected thereto may be simultaneously short circuited and grounded.

At this time, the plurality of shorting blocks 430, 530, 630, and 730 cross the spaces 413, 513, 613, and 713 and are moved in a direction toward and in a direction opposite to the plurality of energization blocks 420, 520, 620, and 720.

In addition, the plurality of energization blocks 420, 520, 620, and 720 and the plurality of shorting blocks 430, 530, 630, and 730 are overlapped in the moving direction.

Accordingly, contact reliability between the shorting blocks 430, 530, 630, and 730 and the energization blocks 420, 520, 620, and 720 may be improved.

In addition, the movement distance of each shorting block 430, 530, 630, and 730 may be limited by contact with each energization block 420, 520, 620, and 720. In other words, even when the handle members 470, 570, 670, and 770 are excessively rotated, each energization block 430, 530, 630, and 730 can be moved only by a predetermined distance.

Furthermore, the above process can be simply performed by rotating the cam members 460, 560, 660, and 760 by rotating the handle members 470, 570, 670, and 770. Accordingly, the plurality of capacitor assemblies 100 can be easily short circuited and grounded at once.

Hereinafter, the operation process of the short circuit regulating device 400, 500, 600, 700 according to each embodiment of the present disclosure will be described in detail with reference to FIGS. 15a to 22b.

(1) Description of Operation Process of Short Circuit Regulating Device 400 According to an Embodiment of Present Disclosure Referring to FIGS. 15a to 16b, an operation process of the short circuit regulating device 400 according to an embodiment of the present disclosure is illustrated.

Figure 15A:
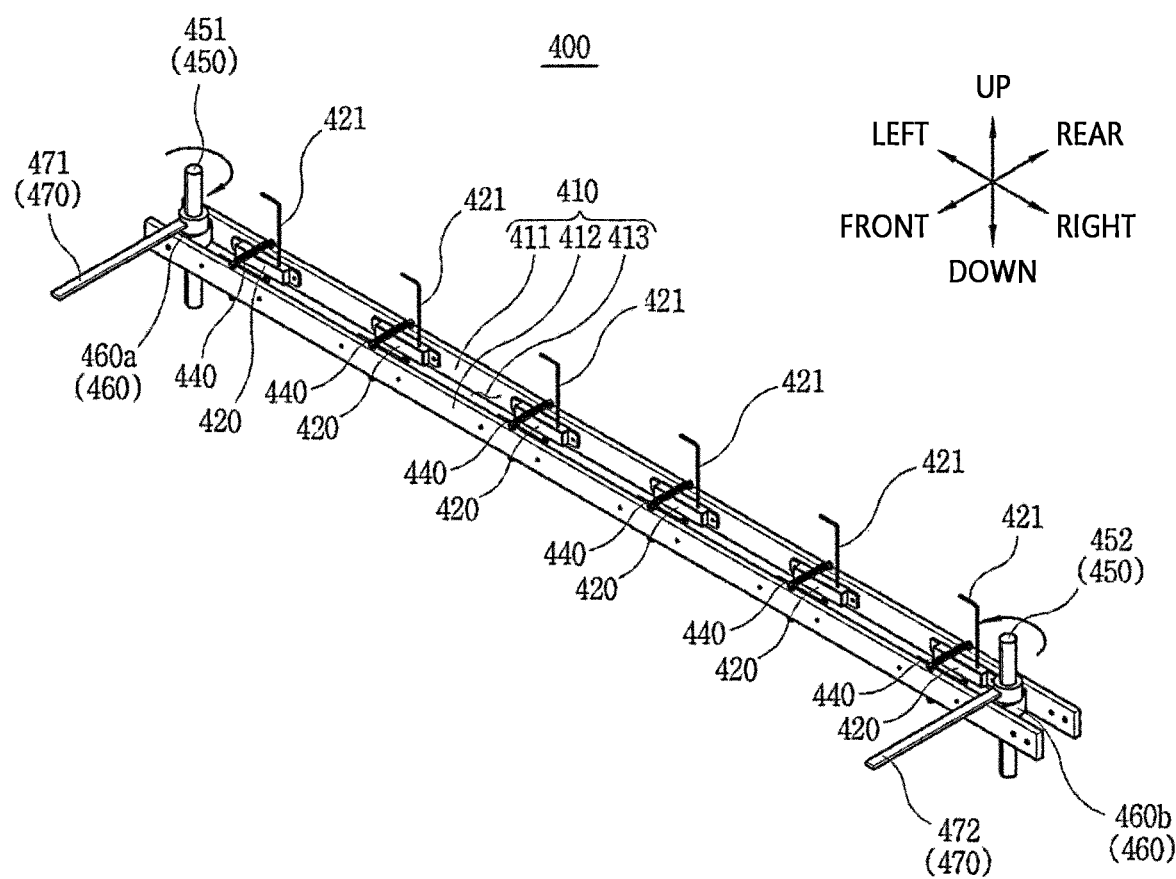
FIGS. 15a and 15b are perspective views illustrating a process in which the grounding mechanism according to the embodiment of FIG. 3 is operated.
Figure 16A:
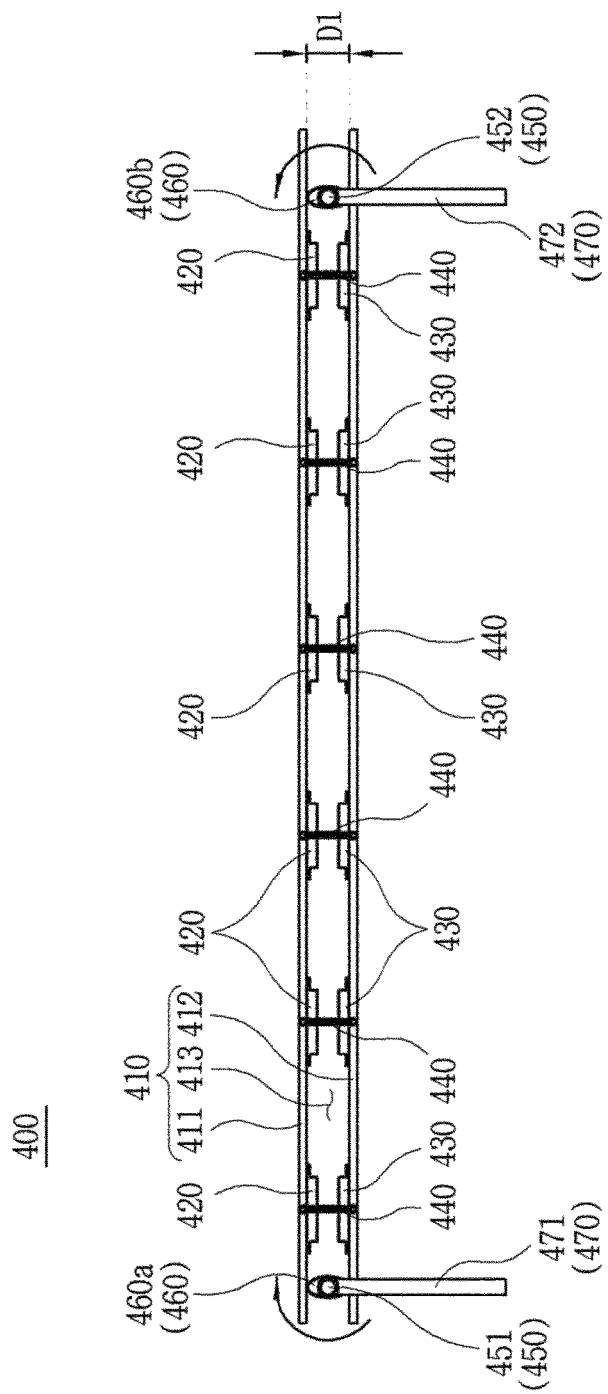
FIGS. 16a and 16b are plan views illustrating a process in which the grounding mechanism according to the embodiment of FIG. 3 is operated.

In the state illustrated in FIGS. 15a and 16a, the energization block 420 and the shorting block 430 are spaced apart from each other. Accordingly, the plurality of capacitor assemblies 100 respectively energizably connected to the plurality of energization blocks 420 are also electrically spaced apart from the shorting block 430. As a result, a plurality of capacitor assemblies 100 can be simultaneously opened.

In this state, the first surface 461 of the cam member 460 is in contact with the first support plate 411 and the second support plate 412, respectively. In other words, the major axis of the cam member 460 is arranged to extend between the first support plate 411 and the second support plate 412.

Therefore, despite the restoring force stored by the elastic member 440, the second support plate 412 and the plurality of shorting blocks 430 coupled thereto are not moved by the cam member 460.

In this state, the distance between the first support plate 411 and the second support plate 412 is the first distance D1, that is, the maximum.

Accordingly, the shape deformation amount of the elastic member 440 is maximized, and the restoring force stored by the elastic member 440 is also maximized. At this time, the direction of the restoring force stored by the elastic member 440 is the direction for returning to the original shape, that is, the rear side in the illustrated embodiment.

Now, when the handle member 470 is rotated to bring the shorting block 430 and the energization block 420 into contact, the cam member 460 coupled thereto is also rotated. In the illustrated embodiment, the first handle member 471 positioned on the left is rotated clockwise, and the second handle member 472 positioned on the right is rotated counterclockwise.

The direction of rotation of the handle member 470 can be changed. However, it is sufficient if the handle member 470 is rotated in a direction that does not affect the movement of the second support plate 412 and the shorting block 430 and the shorting block 430 and the energization block 420.

In other words, as described above, the first surface 461 and the second surface 462 of the cam member 460 are provided in plurality, respectively, and are positioned symmetrically with respect to the shaft member 450. Accordingly, even when the handle member 470 and the cam member 460 connected thereto are rotated in either clockwise or counterclockwise direction, the short circuit regulating device 400 can be operated as expected.

As the handle member 470 rotates, the cam member 460 rotates so that the first surface 461 is spaced apart from the first support plate 411 and the second support plate 412, respectively. In addition, the second surface 462 continuous with the first surface 461 is in contact with the first support plate 411 and the second support plate 412, respectively.

Figure 15B:
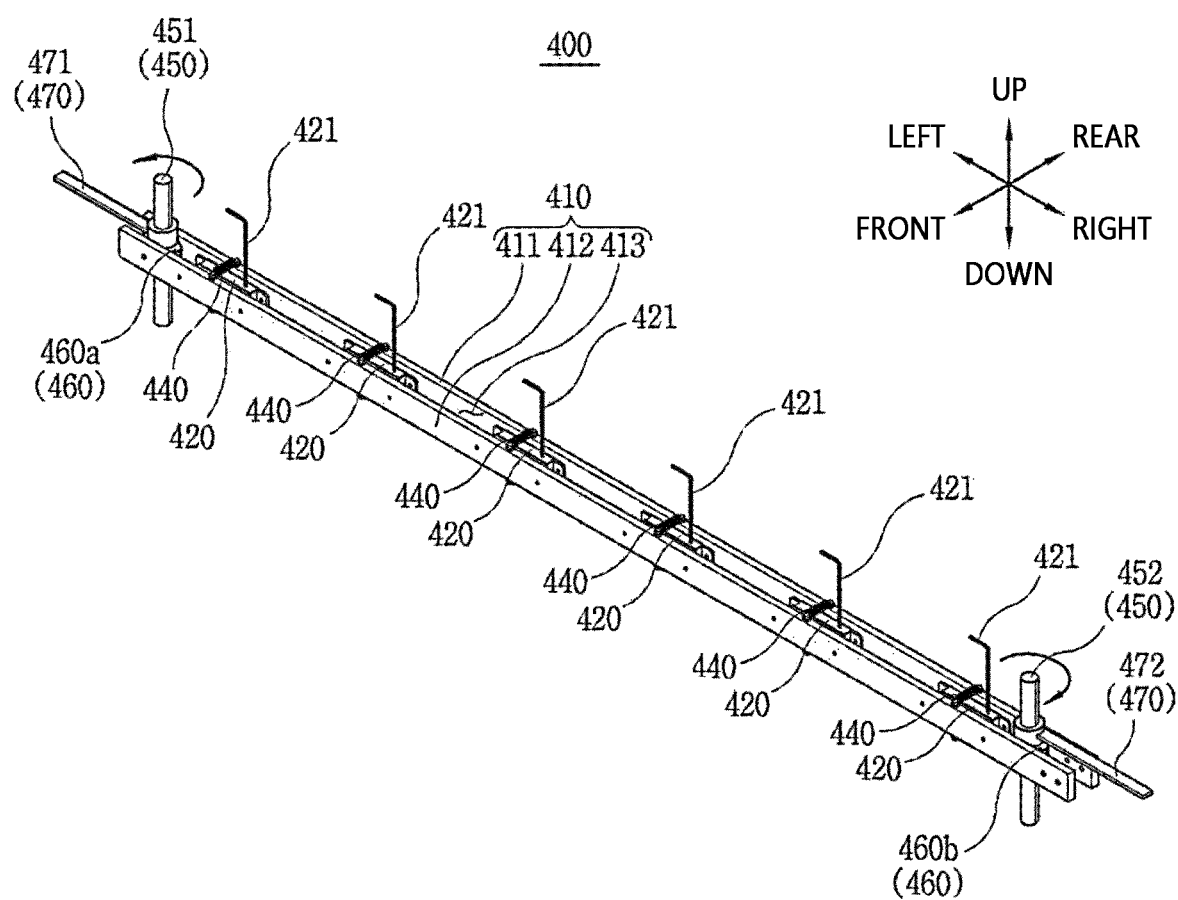
Figure 16B:
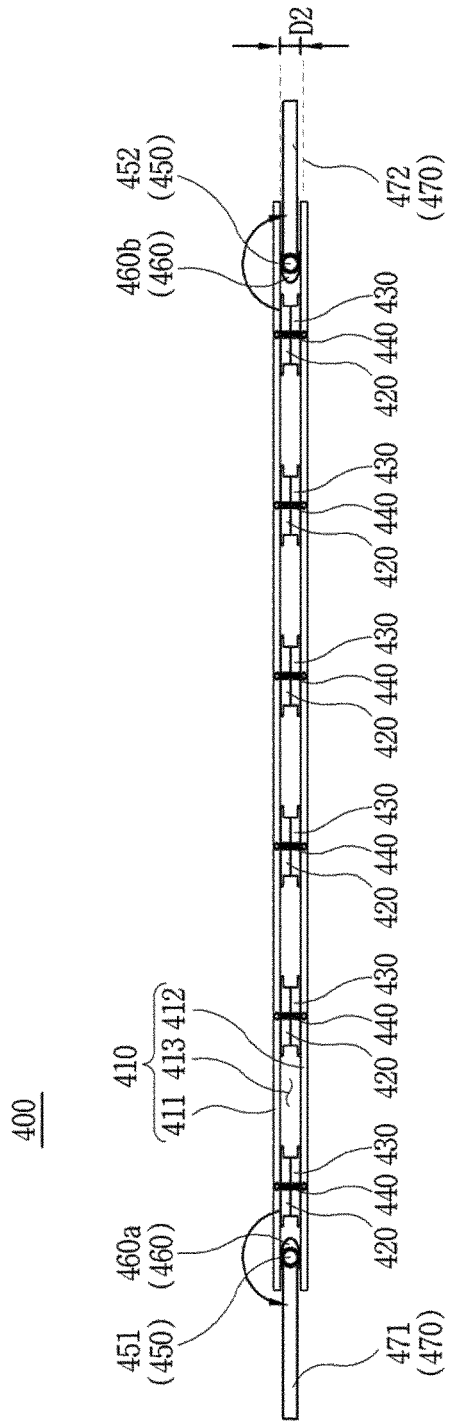

In the state illustrated in FIGS. 15b and 16b, the energization block 420 and the shorting block 430 are in contact with each other and energized.

Accordingly, the plurality of capacitor assemblies 100 respectively energized to the plurality of energization blocks 420 are also energized with the shorting block 430. As a result, a plurality of capacitor assemblies 100 may be short circuited and grounded simultaneously.

In this state, the second surface 462 of the cam member 460 is in contact with the first support plate 411 and the second support plate 412, respectively. In other words, the cam member 460 is arranged such that the minor axis thereof extends between the first support plate 411 and the second support plate 412.

Accordingly, the elastic member 440 may be compressed by the difference between the length of the major axis and the length of the minor axis of the cam member 460. Accordingly, the second supporting plate 412 connected to the elastic member 440 and the shorting block 430 coupled thereto are also moved in a direction toward the first supporting plate 411 and the energization block 420.

In this state, the distance between the first support plate 411 and the second support plate 412 is the second distance D2, that is, the minimum.

Accordingly, the shape deformation amount of the elastic member 440 is minimized, and the restoring force stored by the elastic member 440 is also minimized.

When the handle member 470 is rotated again to separate the shorting block 430 and the energization block 420, the cam member 460 coupled thereto is also rotated. In the illustrated embodiment, the first handle member 471 positioned on the left is rotated counterclockwise, and the second handle member 472 positioned on the right is rotated clockwise.

The direction of rotation of the handle member 470 can be changed. However, it is sufficient if the handle member 470 is rotated in a direction that does not affect the movement of the second support plate 412 and the shorting block 430 and the shorting block 430 and the energization block 420.

As the handle member 470 rotates, the cam member 460 rotates so that the second surface 462 is spaced apart from the first support plate 411 and the second support plate 412, respectively. In addition, the first surface 461 continuous with the second surface 462 is in contact with the first support plate 411 and the second support plate 412, respectively.

Therefore, in the short circuit regulating device 400 according to the present embodiment, the energization block 420 and the shorting block 430 are in contact or separated by the arrangement direction of the cam member 460 and the restoring force stored by the elastic member 440.

As a result, the plurality of capacitor assemblies 100 respectively energizably connected to the plurality of energization blocks 420 may also be short circuited, grounded, or opened at the same time.

Furthermore, since the energization block 420 and the shorting block 430 are in contact with each other or spaced apart from each other, contact reliability between the energization block 420 and the shorting block 430 may be improved.

(2) Description of Operation Process of Short Circuit Regulating Device 500 According to Another Embodiment of Present Disclosure Referring to FIGS. 17a to 18b, an operation process of a short circuit regulating device 500 according to another embodiment of the present disclosure is illustrated.

Figure 17A:
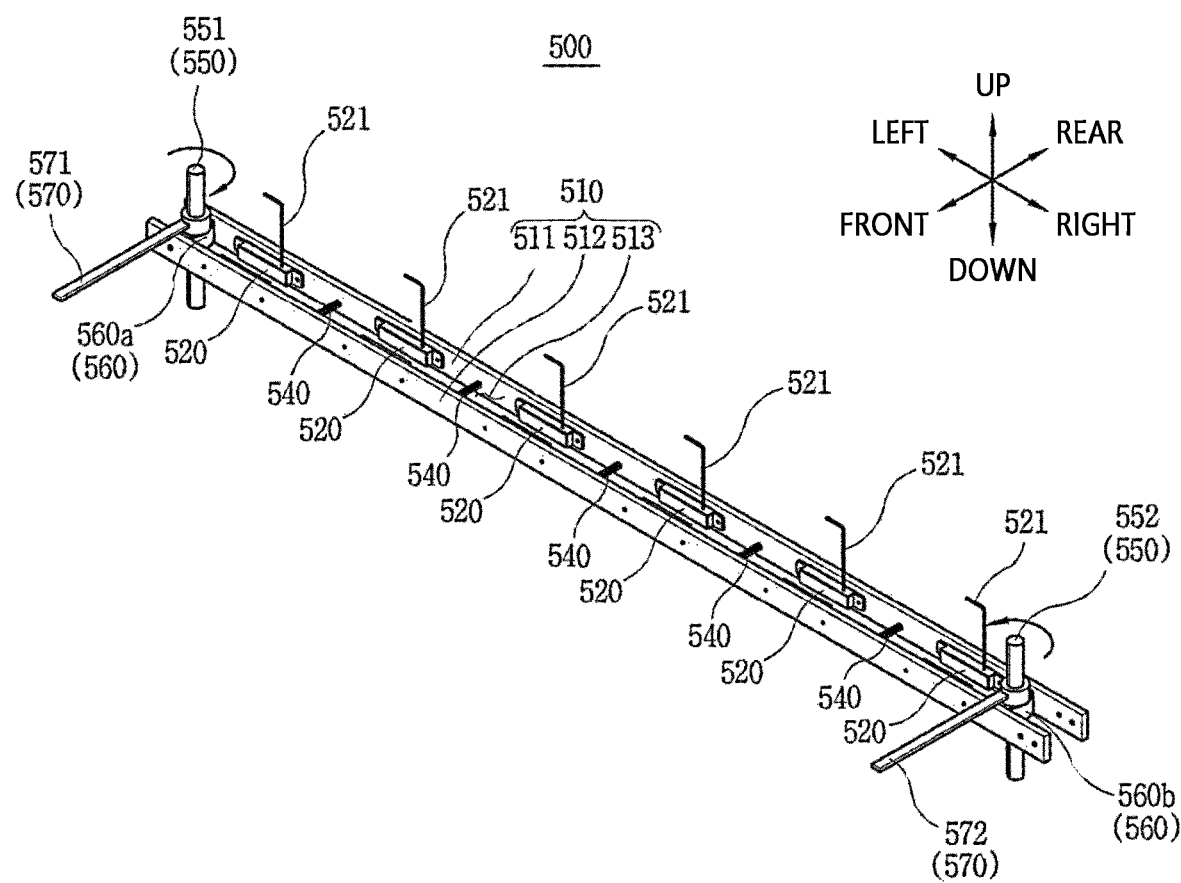
FIGS. 17a and 17b are perspective views illustrating a process in which the grounding mechanism according to the embodiment of FIG. 9 is operated.
Figure 18A:
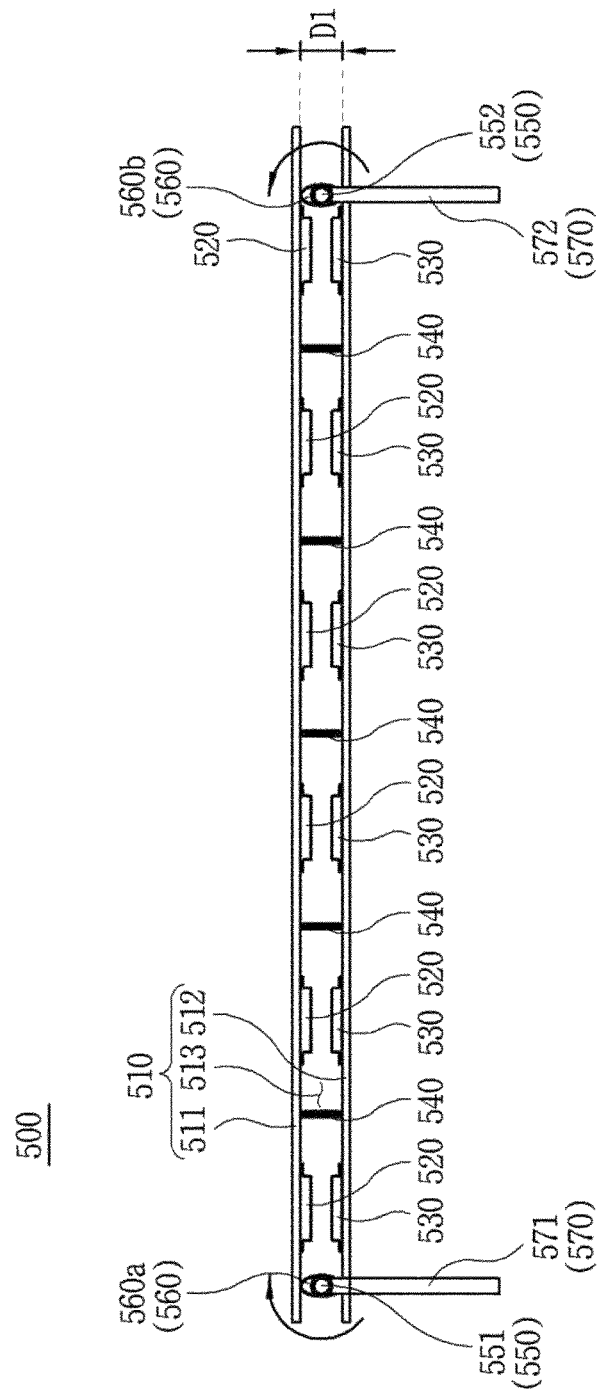
FIGS. 18a and 18b are plan views illustrating a process in which the grounding mechanism according to the embodiment of FIG. 9 is operated.

In the state illustrated in FIGS. 17a and 18a, the energization block 520 and the shorting block 530 are spaced apart from each other. Accordingly, the plurality of capacitor assemblies 100 respectively energizably connected to the plurality of energization blocks 520 are also electrically spaced apart from the shorting block 530. As a result, a plurality of capacitor assemblies 100 can be simultaneously opened.

In this state, the first surface 561 of the cam member 560 is in contact with the first support plate 511 and the second support plate 512, respectively. In other words, the cam member 560 is arranged such that the major axis thereof extends between the first support plate 511 and the second support plate 512.

Therefore, despite the restoring force stored by the elastic member 540, the second support plate 512 and the plurality of shorting blocks 530 coupled thereto are not moved by the cam member 560.

In this state, the distance between the first support plate 511 and the second support plate 512 is the first distance D1, that is, the maximum.

Accordingly, the shape deformation amount of the elastic member 540 is maximized, and the restoring force stored by the elastic member 540 is also maximized. At this time, the direction of the restoring force stored by the elastic member 540 is the direction for returning to the original shape, that is, the rear side in the illustrated embodiment.

Now, when the handle member 570 is rotated to bring the shorting block 530 and the energization block 520 into contact, the cam member 560 coupled thereto is also rotated. In the illustrated embodiment, the first handle member 571 positioned on the left is rotated clockwise, and the second handle member 572 positioned on the right is rotated counterclockwise.

The direction of rotation of the handle member 570 can be changed. However, it is sufficient if the handle member 570 is rotated in a direction that does not affect the movement of the second support plate 512 and the shorting block 530 and the shorting block 530 and the energization block 520.

In other words, as described above, the first surface 561 and the second surface 562 of the cam member 560 are provided in plurality, respectively, and positioned symmetrically with respect to the shaft member 550. Accordingly, even when the handle member 570 and the cam member 560 connected thereto are rotated in either clockwise or counterclockwise direction, the short circuit regulating device 500 can be operated as expected.

As the handle member 570 rotates, the cam member 560 rotates so that the first surface 561 is separated from the first support plate 511 and the second support plate 512, respectively. In addition, the second surface 562 continuous with the first surface 561 is in contact with the first support plate 511 and the second support plate 512, respectively.

Figure 17B:
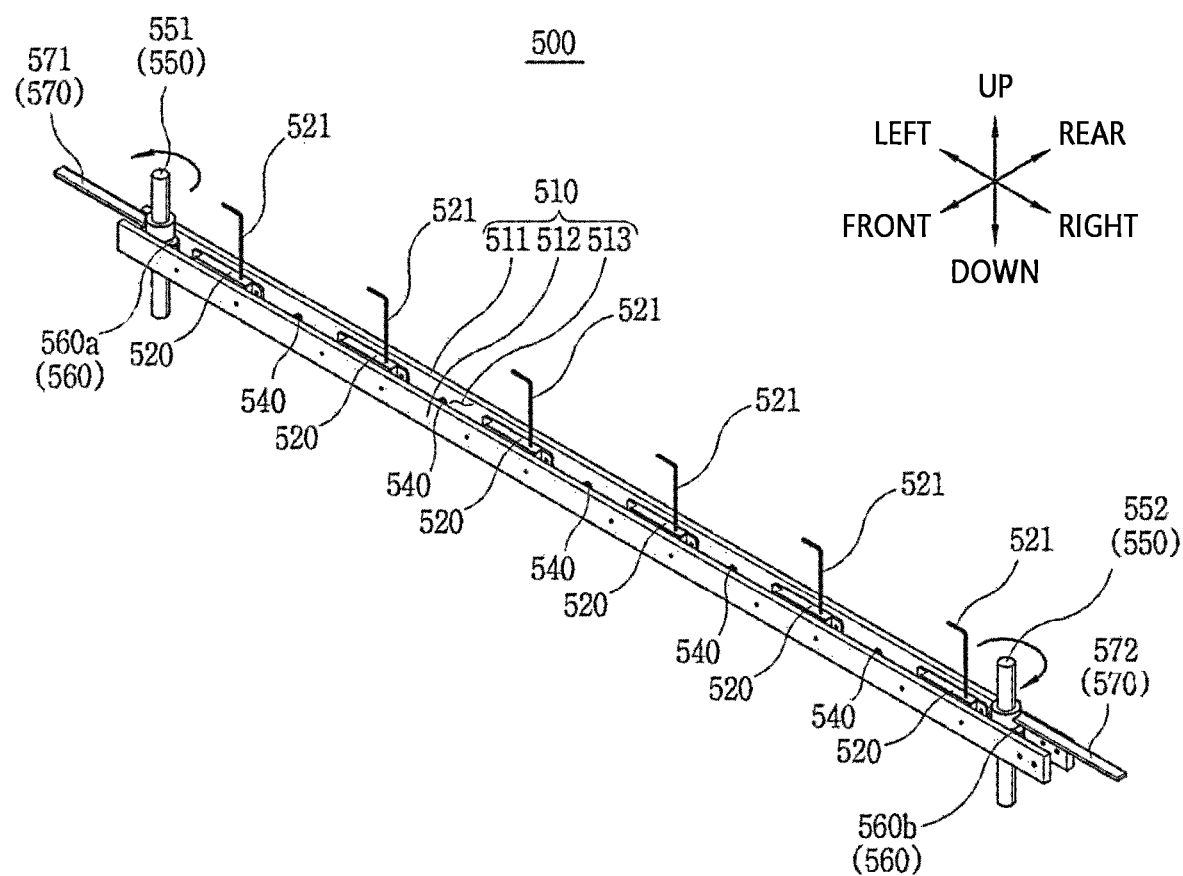
Figure 18B:
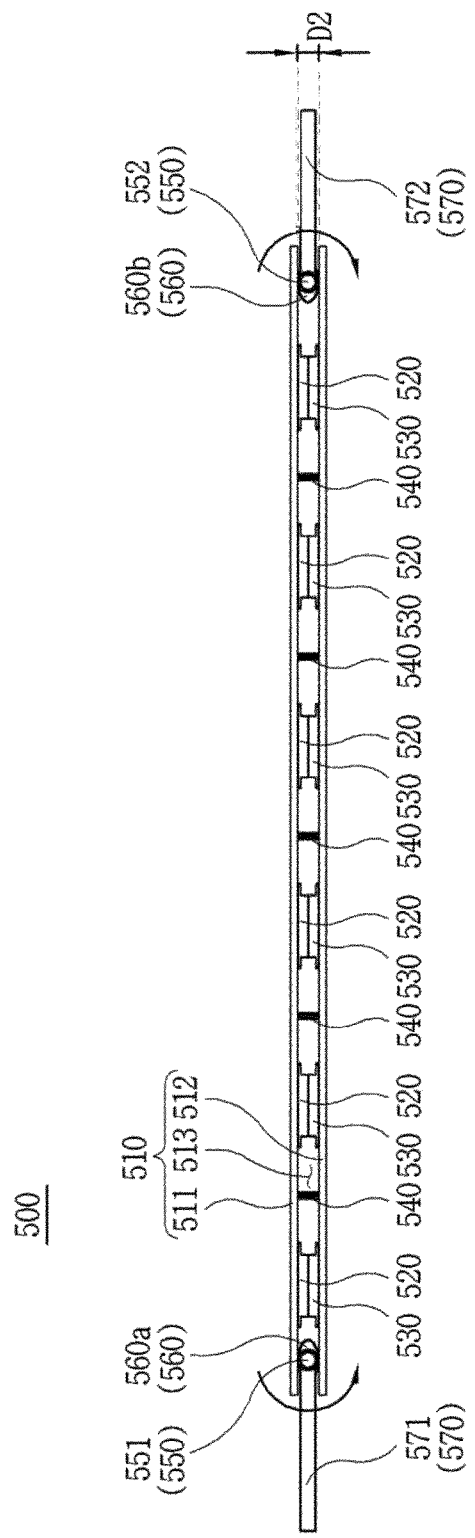

In the state illustrated in FIGS. 17b and 18b, the energization block 520 and the shorting block 530 are in contact with each other and energized.

Accordingly, the plurality of capacitor assemblies 100 connected to the plurality of energization blocks 520 to be energized, respectively, are also energized to the shorting block 530, respectively. As a result, a plurality of capacitor assemblies 100 may be short circuited and grounded simultaneously.

In this state, the second surface 562 of the cam member 560 is in contact with the first support plate 511 and the second support plate 512, respectively. In other words, the cam member 560 is arranged such that the minor axis thereof extends between the first support plate 511 and the second support plate 512.

Accordingly, the elastic member 540 may be compressed by the difference between the length of the major axis and the length of the minor axis of the cam member 560. Accordingly, the second support plate 512 connected to the elastic member 540 and the shorting block 530 coupled thereto are also moved in a direction toward the first support plate 511 and the energization block 520.

In this state, the distance between the first support plate 511 and the second support plate 512 is the second distance D2, that is, the minimum.

Accordingly, the shape deformation amount of the elastic member 540 is minimized, and the restoring force stored by the elastic member 540 is also minimized.

In this state, the extension length of the elastic member 540 is equal to or less than the second distance D2 as described above. Therefore, the elastic member 540 does not affect the contact between the energization block 520 and the shorting block 430.

When the handle member 570 is rotated again to separate the shorting block 530 and the energization block 520, the cam member 560 coupled thereto is also rotated. In the illustrated embodiment, the first handle member 571 positioned on the left is rotated counterclockwise, and the second handle member 572 positioned on the right is rotated clockwise.

The direction of rotation of the handle member 570 can be changed. However, it is sufficient if the handle member 570 is rotated in a direction that does not affect the movement of the second support plate 512 and the shorting block 530 and the shorting block 530 and the energization block 520.

As the handle member 570 rotates, the cam member 560 rotates so that the second surface 562 is spaced apart from the first support plate 511 and the second support plate 512, respectively. In addition, the first surface 561 continuous with the second surface 562 is in contact with the first support plate 511 and the second support plate 512, respectively.

Therefore, in the short circuit regulating device 500 according to the present embodiment, the energization block 520 and the shorting block 530 are in contact or separated by the arrangement direction of the cam member 560 and the restoring force stored by the elastic member 540.

As a result, the plurality of capacitor assemblies 100 respectively energizably connected to the plurality of energization blocks 520 may also be short circuited, grounded, or opened at the same time.

Furthermore, since the energization block 520 and the shorting block 530 are in contact with each other or spaced apart from each other, contact reliability between the energization block 520 and the shorting block 530 may be improved.

(3) Description of Operation Process of Short Circuit Regulating Device 600 According to Another Embodiment of Present Disclosure Referring to FIGS. 19a to 20b, an operation process of a short circuit regulating device 600 according to another embodiment of the present disclosure is illustrated.

Figure 19A:
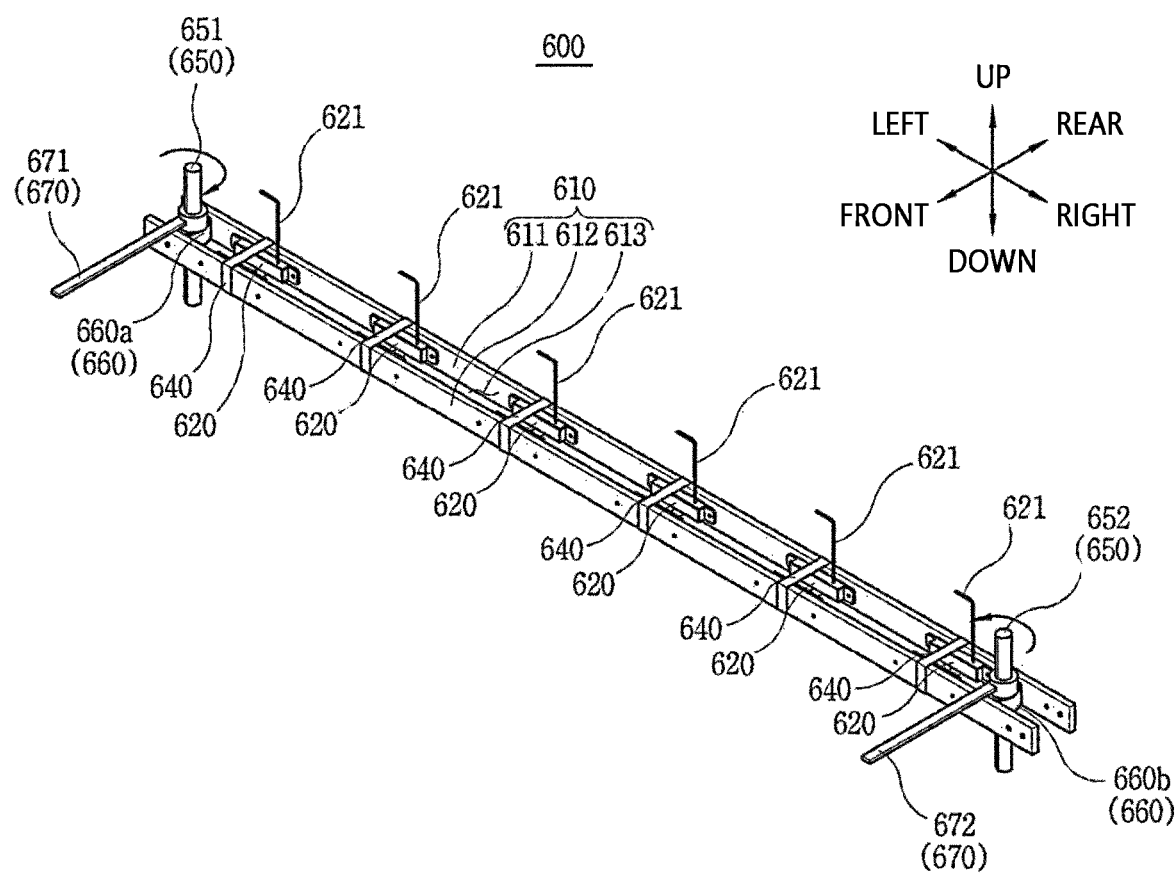
FIGS. 19a and 19b are perspective views illustrating a process in which the grounding mechanism according to the embodiment of FIG. 11 is operated.
Figure 20A:
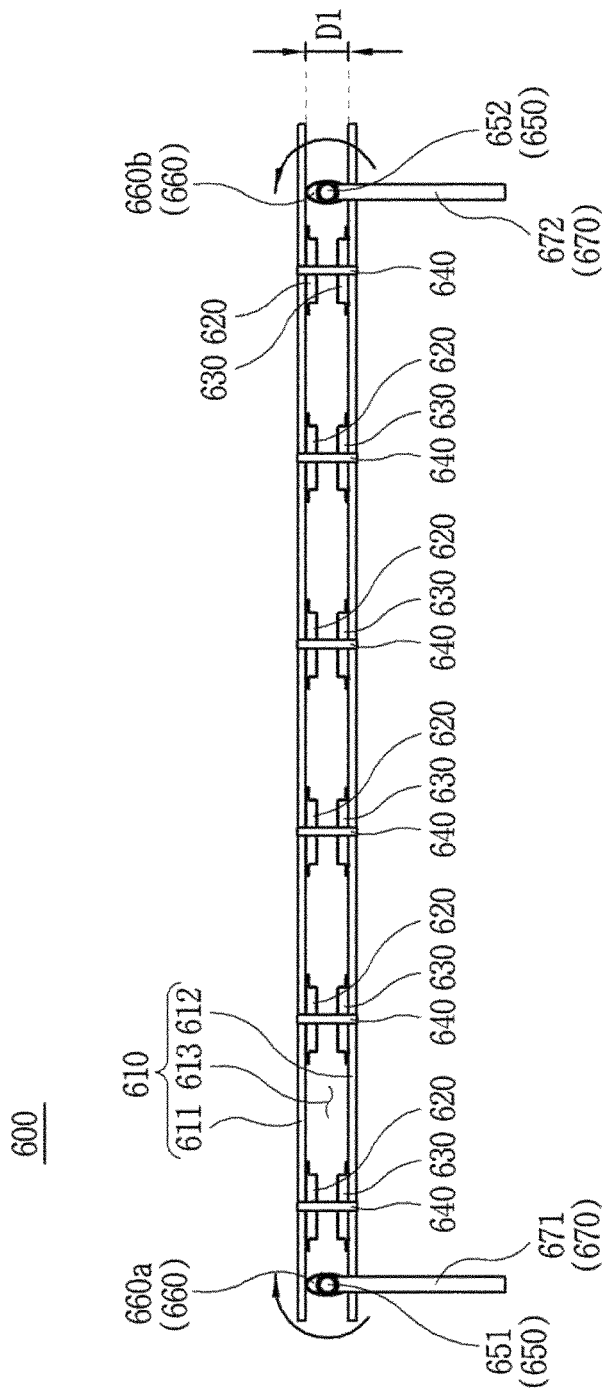
FIGS. 20a and 20b are plan views illustrating a process in which the grounding mechanism according to the embodiment of FIG. 11 is operated.

In the state illustrated in FIGS. 19a and 20a, the energization block 620 and the shorting block 630 are spaced apart from each other. Accordingly, the plurality of capacitor assemblies 100 respectively energizably connected to the plurality of energization blocks 620 are also electrically spaced apart from the shorting block 630. As a result, a plurality of capacitor assemblies 100 can be simultaneously opened.

In this state, the first surface 661 of the cam member 660 is in contact with the first support plate 611 and the second support plate 612, respectively. In other words, the cam member 660 is arranged such that the major axis thereof extends between the first support plate 611 and the second support plate 612.

Therefore, despite the restoring force stored by the elastic member 640, the second support plate 612 and the plurality of shorting blocks 630 coupled thereto are not moved by the cam member 660.

In this state, the distance between the first support plate 611 and the second support plate 612 is the first distance D1, that is, the maximum.

Accordingly, the shape deformation amount of the elastic member 640 is maximized, and the restoring force stored by the elastic member 640 is also maximized. At this time, the direction of the restoring force stored by the elastic member 640 is the direction for returning to the original shape, that is, the rear side in the illustrated embodiment.

Now, when the handle member 670 is rotated to bring the shorting block 630 and the energization block 620 into contact, the cam member 660 coupled thereto is also rotated. In the illustrated embodiment, the first handle member 671 positioned on the left is rotated clockwise, and the second handle member 672 positioned on the right is rotated counterclockwise.

The direction of rotation of the handle member 670 can be changed. However, it is sufficient if the handle member 670 is rotated in a direction that does not affect the movement of the second support plate 612 and the shorting block 630 and the shorting block 630 and the energization block 620.

In other words, as described above, the first surface 661 and the second surface 662 of the cam member 660 are provided in plurality, respectively, and are positioned symmetrically with respect to the shaft member 650. Accordingly, even when the handle member 670 and the cam member 660 connected thereto are rotated in either clockwise or counterclockwise direction, the short circuit regulating device 600 can be operated as expected.

As the handle member 670 rotates, the cam member 660 rotates so that the first surface 661 is spaced apart from the first support plate 611 and the second support plate 612, respectively. In addition, the second surface 662 continuous with the first surface 661 is in contact with the first support plate 611 and the second support plate 612, respectively.

Figure 19B:
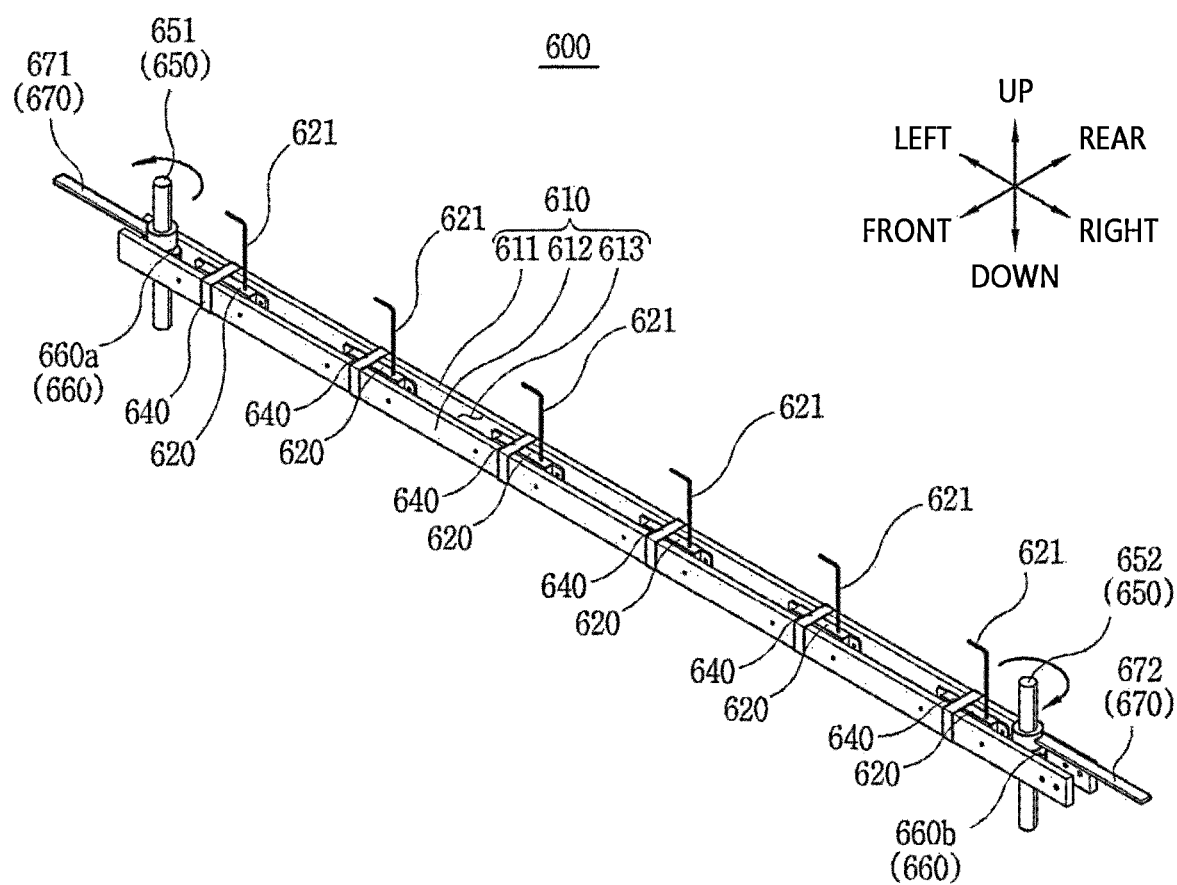
Figure 20B:
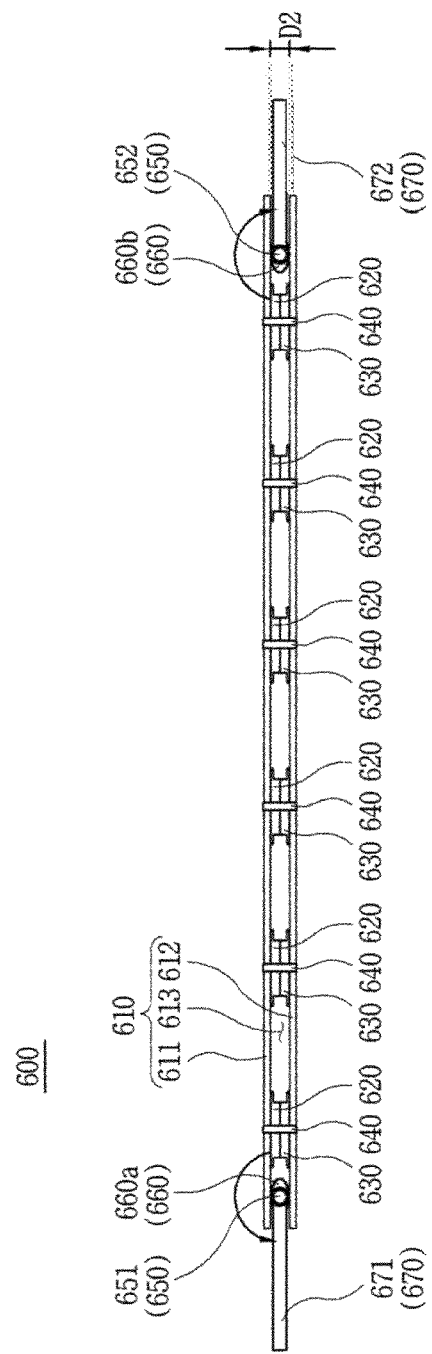

In the state illustrated in FIGS. 19b and 20b, the energization block 620 and the shorting block 630 are in contact with each other and energized.

Accordingly, the plurality of capacitor assemblies 100 energizably connected to the plurality of energization blocks 620, respectively, are also energized with the shorting block 630, respectively. As a result, a plurality of capacitor assemblies 100 may be short circuited and grounded simultaneously.

In this state, the second surface 662 of the cam member 660 is in contact with the first support plate 611 and the second support plate 612, respectively. In other words, the cam member 660 is arranged such that the minor axis thereof extends between the first support plate 611 and the second support plate 612.

Accordingly, the elastic member 640 may be compressed by the difference between the length of the major axis and the length of the minor axis of the cam member 660. Accordingly, the second supporting plate 612 connected to the elastic member 640 and the shorting block 630 coupled thereto are also moved in a direction toward the first supporting plate 611 and the energization block 620.

In this state, the distance between the first support plate 611 and the second support plate 612 is the second distance D2, that is, the minimum.

Accordingly, the shape deformation amount of the elastic member 640 is minimized, and the restoring force stored by the elastic member 640 is also minimized.

When the handle member 670 is rotated again to separate the shorting block 630 and the energization block 620, the cam member 660 coupled thereto is also rotated. In the illustrated embodiment, the first handle member 671 positioned on the left is rotated counterclockwise, and the second handle member 672 positioned on the right is rotated clockwise.

The direction of rotation of the handle member 670 can be changed. However, it is sufficient if the handle member 670 is rotated in a direction that does not affect the movement of the second support plate 612 and the shorting block 630 and the shorting block 630 and the energization block 620.

As the handle member 670 rotates, the cam member 660 rotates so that the second surface 662 is spaced apart from the first support plate 611 and the second support plate 612, respectively. In addition, the first surface 661 continuous with the second surface 662 is in contact with the first support plate 611 and the second support plate 612, respectively.

Therefore, in the short circuit regulating device 600 according to the present embodiment, the energization block 620 and the shorting block 630 are in contact or separated by the arrangement direction of the cam member 660 and the restoring force stored by the elastic member 640.

As a result, the plurality of capacitor assemblies 100 energizably connected to the plurality of energization blocks 620, respectively, may also be short circuited, grounded, or opened at the same time.

Furthermore, since the energization block 620 and the shorting block 630 are in contact with each other or spaced apart from each other, contact reliability between the energization block 620 and the shorting block 630 may be improved.

(4) Description of the Operation Process of Short Circuit Regulating Device 700 According to Another Embodiment of Present Disclosure Referring to FIGS. 21a to 22b, an operation process of a short control device 700 according to another embodiment of the present disclosure is illustrated.

Figure 21A:
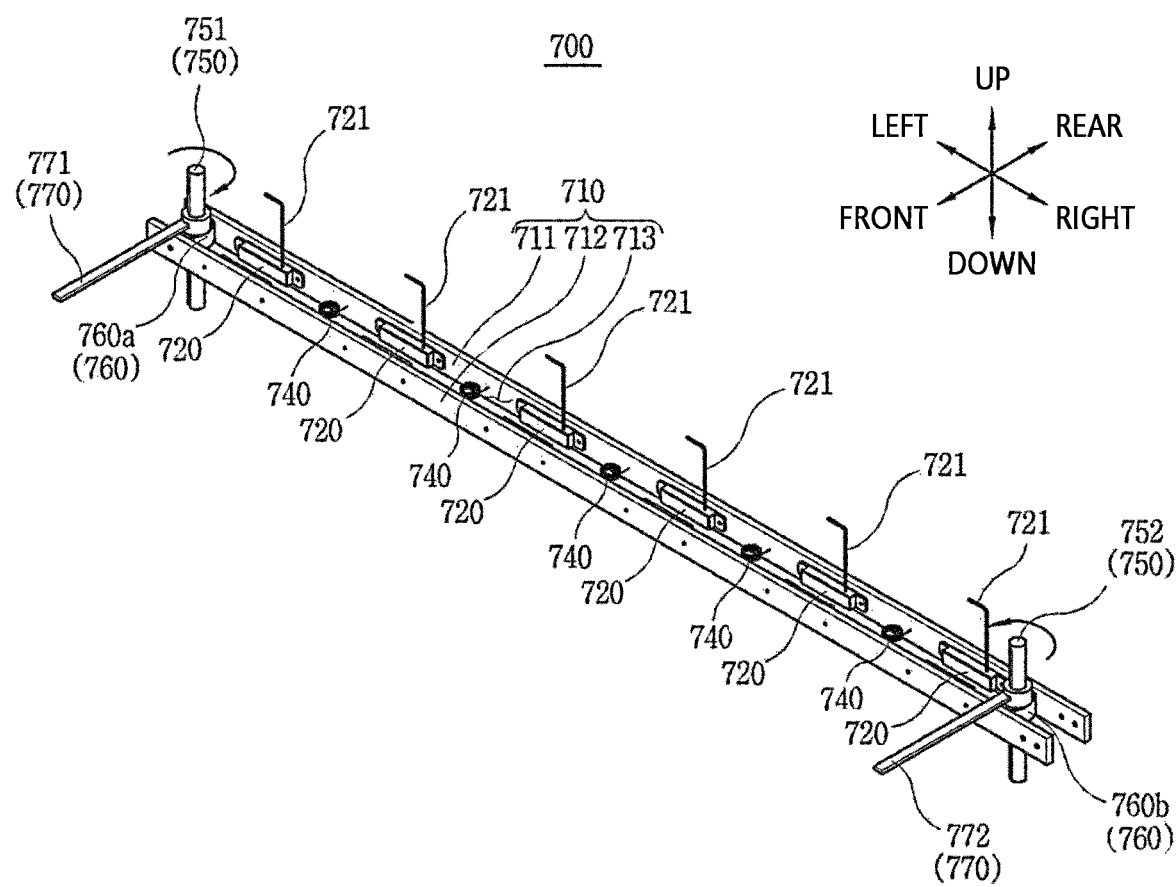
FIGS. 21a and 21b are perspective views illustrating a process in which the grounding mechanism according to the embodiment of FIG. 13 is operated.
Figure 22A:
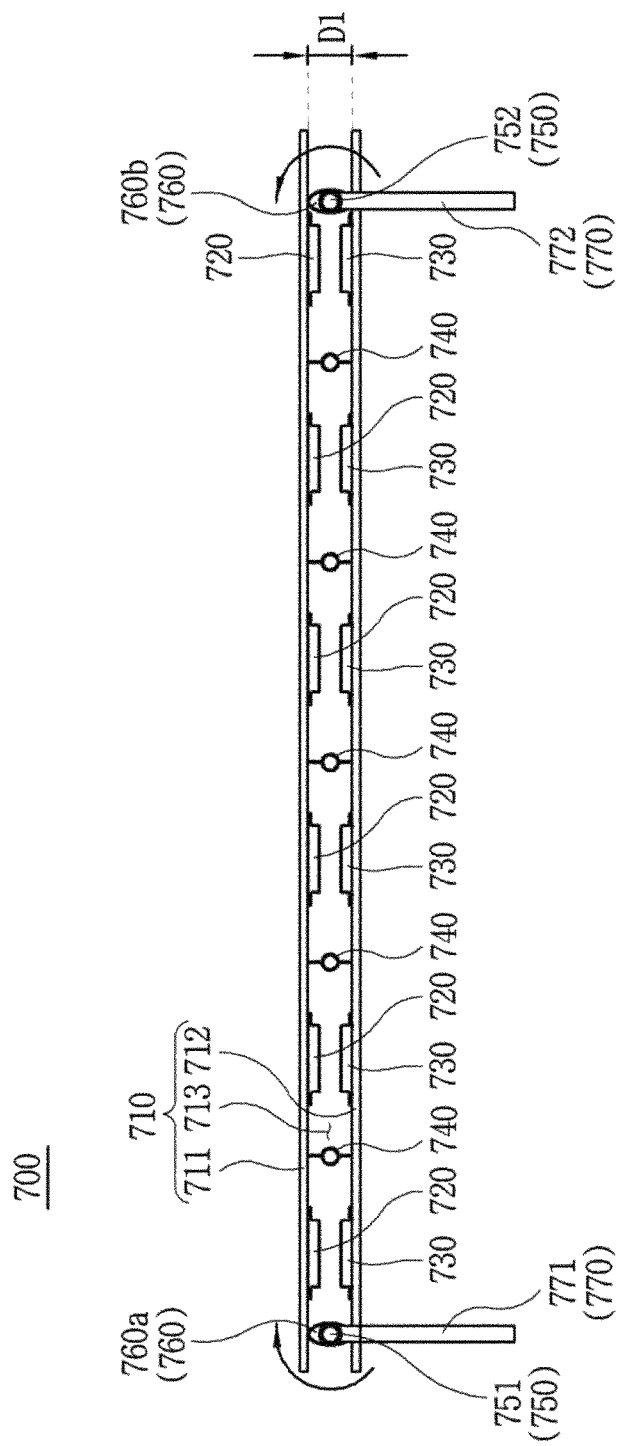
FIGS. 22a and 22b are plan views illustrating a process in which the grounding mechanism according to the embodiment of FIG. 13 is operated.

In the state illustrated in FIGS. 21a and 22a, the energization block 720 and the shorting block 730 are spaced apart from each other. Accordingly, the plurality of capacitor assemblies 100 respectively energizably connected to the plurality of energization blocks 720 are also electrically spaced apart from the shorting block 730. As a result, a plurality of capacitor assemblies 100 can be simultaneously opened.

In this state, the first surface 761 of the cam member 760 is in contact with the first support plate 711 and the second support plate 712, respectively. In other words, the cam member 760 is arranged such that the major axis thereof extends between the first support plate 711 and the second support plate 712.

Therefore, despite the restoring force stored by the elastic member 740, the second support plate 712 and the plurality of shorting blocks 730 coupled thereto are not moved by the cam member 760.

In this state, the distance between the first support plate 711 and the second support plate 712 is the first distance D1, that is, the maximum.

Accordingly, the shape deformation amount of the elastic member 740 is maximized, and the restoring force stored by the elastic member 740 is also maximized. At this time, the direction of the restoring force stored by the elastic member 740 is the direction for returning to the original shape, that is, the rear side in the illustrated embodiment.

Now, when the handle member 770 is rotated to bring the shorting block 730 and the energization block 720 into contact, the cam member 760 coupled thereto is also rotated. In the illustrated embodiment, the first handle member 771 positioned on the left is rotated clockwise, and the second handle member 772 positioned on the right is rotated counterclockwise.

The direction of rotation of the handle member 770 can be changed. However, it is sufficient if the handle member 770 is rotated in a direction that does not affect the movement of the second support plate 712 and the shorting block 730 and the shorting block 730 and the energization block 720.

In other words, as described above, the first surface 761 and the second surface 762 of the cam member 760 are provided in plurality, respectively, and positioned symmetrically with respect to the shaft member 750. Accordingly, even when the handle member 770 and the cam member 760 connected thereto are rotated clockwise or counterclockwise, the short circuit regulating device 700 can operate as expected.

As the handle member 770 rotates, the cam member 760 rotates so that the first surface 761 is spaced apart from the first support plate 711 and the second support plate 712, respectively. In addition, the second surface 762 continuous with the first surface 761 is in contact with the first support plate 711 and the second support plate 712, respectively.

Figure 21B:
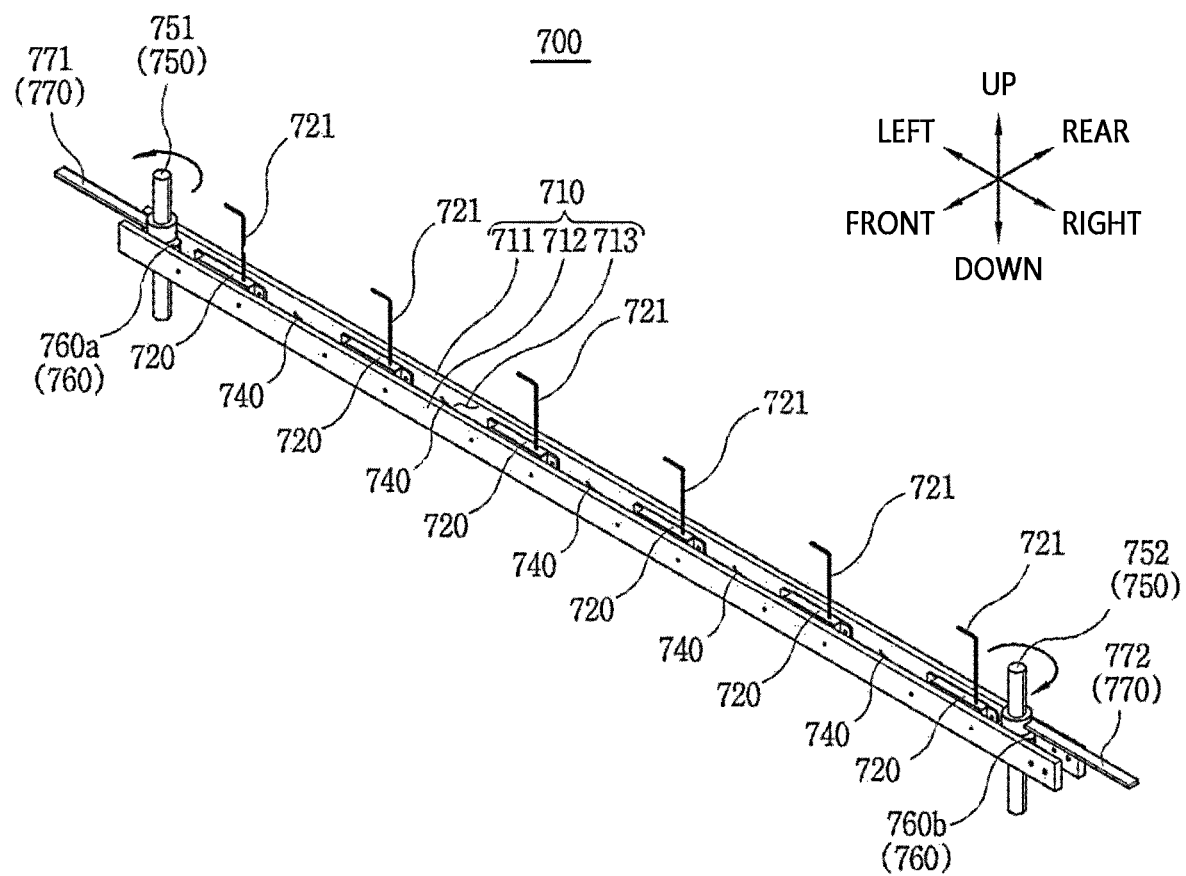
Figure 22B:
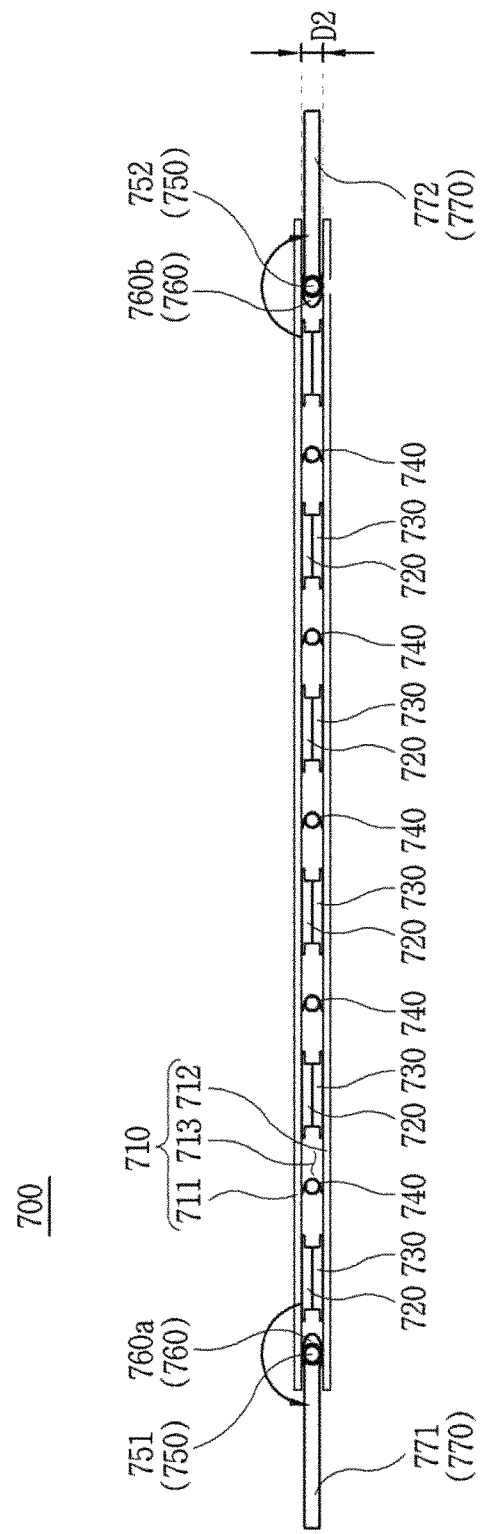

In the state illustrated in FIGS. 21b and 22b, the energization block 720 and the shorting block 730 are in contact with each other and energized.

Accordingly, the plurality of capacitor assemblies 100 respectively energizably connected to the plurality of energization blocks 720 are also energized with the shorting block 730. As a result, a plurality of capacitor assemblies 100 may be short circuited and grounded simultaneously.

In this state, the second surface 762 of the cam member 760 is in contact with the first support plate 711 and the second support plate 712, respectively. In other words, the cam member 760 is arranged such that the minor axis thereof extends between the first support plate 711 and the second support plate 712.

Accordingly, the elastic member 740 may be compressed by the difference between the length of the long axis and the length of the minor axis of the cam member 760. Accordingly, the second supporting plate 712 connected to the elastic member 740 and the shorting block 730 coupled thereto also move in a direction toward the first supporting plate 711 and the energization block 720.

In this state, the distance between the first support plate 711 and the second support plate 712 is the second distance D2, that is, the minimum.

Accordingly, the shape deformation amount of the elastic member 740 is minimized, and the restoring force stored by the elastic member 740 is also minimized.

In the above state, the extension length of the elastic member 740 is equal to or less than the second distance D2 as described above. Therefore, the elastic member 740 does not affect the contact between the energization block 720 and the shorting block 430.

When the handle member 770 is rotated again to separate the shorting block 730 and the energization block 720, the cam member 760 coupled thereto is also rotated. In the illustrated embodiment, the first handle member 771 positioned on the left is rotated counterclockwise, and the second handle member 772 positioned on the right is rotated clockwise.

The direction of rotation of the handle member 770 can be changed. However, it is sufficient if the handle member 770 is rotated in a direction that does not affect the movement of the second support plate 712 and the shorting block 730 and the shorting block 730 and the energization block 720.

As the handle member 770 rotates, the cam member 760 rotates so that the second surface 762 is spaced apart from the first support plate 711 and the second support plate 712, respectively. In addition, the first surface 761 continuous with the second surface 762 is in contact with the first support plate 711 and the second support plate 712, respectively.

Therefore, in the short circuit regulating device 700 according to the present embodiment, the energization block 720 and the shorting block 730 are in contact or separated by the arrangement direction of the cam member 760 and the restoring force stored by the elastic member 740.

As a result, the plurality of capacitor assemblies 100 energizably connected to the plurality of energization blocks 720, respectively, may also be short circuited, grounded, or opened at the same time.

Moreover, since the contacting surfaces of the energization block 720 and the shorting block 730 are in contact with each other or spaced apart from each other, contact reliability between the energization block 720 and the shorting block 730 may be improved.

Although the above has been described with reference to the preferred embodiments of the present disclosure, those skilled in the art will understand that various modifications and changes can be made to the present disclosure without departing from the spirit and scope of the present disclosure described in the claims below.

1: Modular Multilevel Converter
10: Sub Module
20: Frame
21: Vertical Frame
22: Horizontal Frame
23: Support Frame
24: Fixed Frame
25: Piping Member
100: Capacitor Assembly
110: Capacitor Cart Portion
200: Valve Assembly
220: Valve Assembly Cart Portion
300: Grounding Portion
400: Short Circuit Regulating Device according to An Embodiment of Present Disclosure
410: Support Portion
411: first support plate
412: Second Support Plate
413: Space Portion
420: Energization Block
421: Conducting Wire Member
430: Shorting Block
440: Elastic Member
440a: First Elastic Member
440b: Second Elastic Member
441: Fixing Portion
450: Shaft Member
451: First Axis
452: Second Axis
460: Cam Member
460a: First Cam Member
460b: Second Cam Member
461 First Portion
462 Second Portion
470: Handle Member
471: First Handle Member
472: Second Handle Member
500: Short Circuit Regulating Device according to Another Embodiment of Present Disclosure
510: Support Portion
511: First Support Plate
512 Second Support Plate
513: Space Portion
520: Energization Block
521: Conducting Wire Member
530: Shorting Block
540: Elastic Member
550: Shaft Member
551: First Axis
552: Second Axis
560: Cam Member
560a: First Cam Member
560b: Second Cam Member
561 First Portion
562 Second Portion
570: Handle Member
571: First Handle Member
572: Second Handle Member
600: Short Circuit Regulating Device according to Another Embodiment of Present Disclosure
610: Support Portion
611: First Support Plate
612: Second Support Plate
613: Space Portion
620: Energization Block
621: Conducting Wire Member
630: Shorting Block
640: Elastic Member
650: Shaft Member
651: First Axis
652: Second Axis
660: Cam Member
660a: First Cam Member
660b: Second Cam Member
661 First Portion
662 Second Portion
670: Handle Member
671: First Handle Member
672: Second Handle Member
700: Short Circuit Regulating Device according to Another Embodiment of Present Disclosure
710: Support Portion
711: first support plate
712 Second Support Plate
713: Space Portion
720: Energization Block
721: Conducting Wire Member
730: Shorting Block
740: Elastic Member
750: shaft member
751: First Axis
752: Second Axis
760: Cam Member
760a: First Cam Member
760b: Second Cam Member
761 First Portion
762 Second Portion
770: Handle Member
771: First Handle Member
772: Second Handle Member
D1: First Distance
D2: Second Distance

The invention claimed is:

1. A short circuit regulating device comprising:
a first support plate extending in one direction;
a second support plate extending in one direction, spaced apart from the first support plate, positioned facing the first support plate, and moves in a direction toward the first support plate and in a direction opposite to the first support plate along the other direction;

an energization block coupled to the first support plate, positioned to face the second support plate, and energizably connected to an external capacitor assembly;

a shorting block coupled to the second support plate, positioned to face the energization block, and energizably connected to an external ground; and a cam member positioned between the first support plate and the second support plate, and in contact with the first support plate and the second support plate, respectively, wherein the cross section of the cam member is formed with different lengths in one direction and in the other direction, and wherein, when the cam member is rotated, the shorting block is in contact with or spaced apart from the energization block.

2. The short circuit regulating device of claim 1, wherein the cam member has an elliptical cross section.

3. The short circuit regulating device of claim 2, wherein the cam member includes:

a first surface that forms a portion of the outer circumferential surface, has a minor axis as a string, and has a predetermined curvature; and a second surface that is continuous with the first surface, forms the remaining portion of the outer circumferential surface, has a major axis as a string, and has a predetermined curvature smaller than the first surface, and wherein when the cam member is rotated, the first surface and the second surface are alternately in contact with the first support plate and the second support plate, respectively.

4. The short circuit regulating device of claim 1, further comprising:

a shaft member positioned between the first support plate and the second support plate and coupled to the cam member to rotate together with the cam member; and a handle member coupled to the shaft member to rotate together with the shaft member and extending outwardly.

5. The short circuit regulating device of claim 4, wherein the handle member is provided to be rotatable by a predetermined angle in a clockwise direction or a counterclockwise direction, and wherein the cam member is rotated by the predetermined angle together with the handle member.

6. The short circuit regulating device of The short circuit regulating device of wherein the predetermined angle is a right angle.

7. The short circuit regulating device of claim 1, further comprising:

an elastic member coupled to the first support plate and the second support plate, respectively to apply a restoring force in a direction toward the first support plate to the second support plate.

8. The short circuit regulating device of claim 7, wherein the magnitude of the restoring force stored in the elastic member when the energization block and the shorting block are spaced apart is greater than the magnitude of the restoring force stored in the elastic member when the energization block and the shorting block are in contact with each other.

9. The short circuit regulating device of claim 7, wherein the elastic member is provided as a coil spring and extends between the first support plate and the second support plate, and is positioned to overlap the energization block and the shorting block along the other direction.

10. The short circuit regulating device of claim 7, wherein the elastic member is provided as a coil spring extending in the other direction, and each end of the extension direction is coupled to each surface of the first support plate and the second support plate facing each other, and wherein each end of the elastic member is positioned adjacent to the energization block and the shorting block, respectively.

11. The short circuit regulating device of claim 10, wherein the energization block and the shorting block are each formed to have a predetermined thickness, and wherein the extension length of the elastic member in a state in which the energization block and the shorting block are in contact with each other is equal to or less than the sum of the thickness of the energization block and the thickness of the shorting block.

12. The short circuit regulating device of claim 7, wherein the elastic member is provided with a band of stretchable material, surrounds the first support plate and the second support plate from the outside, is coupled to the first support plate and the second support plate, and is positioned overlapping with the energization block and the shorting block along the other direction.

13. The short circuit regulating device of claim 7, wherein the elastic member is provided as a torsion spring, and each end in the extending direction is coupled to each surface where the first support plate and the second support plate face each other, and wherein each end of the elastic member is positioned adjacent to the energization block and the shorting block, respectively.

14. The short circuit regulating device of claim 1, wherein a plurality of energization blocks and a plurality of shorting blocks are provided, respectively, wherein a plurality of the energization blocks are spaced apart from each other in the one direction and is energizably connected to each of the plurality of capacitor assemblies, and wherein a plurality of shorting blocks are spaced apart from each other in the one direction and positioned to overlap each other with a plurality of the energization blocks in the other direction, respectively.

15. A modular multi-level converter, comprising:

a frame;

a plurality of capacitor assemblies inserted into or withdrawn from the frame; and a short circuit regulating device coupled to the frame and energizably connected to the capacitor assembly and an external ground, respectively, wherein the short circuit adjustment device includes a first support plate coupled to the frame and extending in one direction;

a second support plate extending in one direction, spaced apart from the first support plate, positioned facing the first support plate, and coupled to the first support plate to be movable in a direction toward the first support plate and in a direction opposite to the first support plate;

a plurality of energization blocks coupled to the first support plate, positioned to face the second support plate, and energizedly connected to the plurality of capacitor assemblies, respectively;

a plurality of shorting blocks coupled to the second support plate, positioned to face the plurality of energization blocks, and energizedly connected to an external ground to be energized, respectively;

a cam member rotatably positioned between the first support plate and the second support plate and in contact with the first support plate and the second support plate, respectively; and an elastic member coupled to the first support plate and the second support plate, respectively, to apply a restoring force in a direction toward the first support plate to the second support plate, wherein the cam member has the cross section having an ellipse shape including a major axis and a minor axis, respectively, wherein when the cam member is rotated and the minor axis is arranged in the one direction, the shorting block and the energization block are spaced apart, and wherein when the cam member is rotated and the major axis is arranged in the one direction, the shorting block and the energization block are in contact with each other.

16. The modular multi-level converter of claim 15, wherein a plurality of the shorting blocks and a plurality of the energization blocks are disposed spaced apart from each other in the one direction, and wherein the plurality of elastic members are provided, spaced apart from each other in the one direction and positioned adjacent to the shorting block and the energization block, respectively.

17. The modular multi-level converter of claim 15, wherein the elastic member is provided as a coil spring and extends between the first support plate and the second support plate, and is positioned to overlap the energization block and the shorting block in the other direction.

18. The modular multi-level converter of claim 15, wherein the elastic member is provided as a coil spring and extends between the first support plate and the second support plate, and wherein one end in the extending direction is coupled with the first supporting plate between a plurality of the energization blocks, and the other end in the extending direction is coupled with the second supporting plate between a plurality of the shorting blocks.

19. The modular multi-level converter of The modular multi-level converter of wherein the elastic member is provided with a band of stretchable material, surrounds the first support plate and the second support plate from the outside and is coupled to the first support plate and the second support plate, and positioned to overlap with the energization block and the shorting block in the other direction.

20. The modular multi-level converter of claim 15, further comprising:

a shaft member positioned between the first support plate and the second support plate and coupled to the cam member to rotate together; and a handle member coupled to the shaft member to rotate together with the shaft member and extending outwardly.

* * * * *